(12) United States Patent
Enke et al.

(10) Patent No.: US 12,212,847 B2
(45) Date of Patent: *Jan. 28, 2025

(54) COMBINED MECHANICAL AND ELECTRONIC IMAGE STABILIZATION

(71) Applicant: GoPro, Inc., San Mateo, CA (US)

(72) Inventors: Joseph A. Enke, Campbell, CA (US); Stepan Moskovchenko, Belmont, CA (US); Benjamin P. Tankersley, San Mateo, CA (US); Adam Fenn, San Francisco, CA (US); Nenad Uzunovic, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,569

(22) Filed: Mar. 13, 2024

(65) Prior Publication Data

US 2024/0259683 A1 Aug. 1, 2024

Related U.S. Application Data

(63) Continuation of application No. 18/143,130, filed on May 4, 2023, now Pat. No. 11,936,982, which is a
(Continued)

(51) Int. Cl.
*H04N 23/68* (2023.01)
*G01C 21/10* (2006.01)
(Continued)

(52) U.S. Cl.
CPC .......... *H04N 23/685* (2023.01); *G01C 21/10* (2013.01); *G02B 27/646* (2013.01); *H04N 23/60* (2023.01);
(Continued)

(58) Field of Classification Search
CPC ............ H04N 5/2328; H04N 5/23258; H04N 5/23296; H04N 5/2253; H04N 5/23264;
(Continued)

(56) References Cited

U.S. PATENT DOCUMENTS 5,469,209 A 11/1995 Gunday
5,548,327 A 8/1996 Gunday
(Continued)

FOREIGN PATENT DOCUMENTS

CN 101370128 A 2/2009
CN 101872196 A 10/2010
(Continued)

OTHER PUBLICATIONS

DJI Inspire 1 User Manual, V2.2, 2017 (Year: 2017) (64 pages).
(Continued)

*Primary Examiner* — Pritham D Prabhakher
(74) *Attorney, Agent, or Firm* — Young Basile Hanlon & MacFarlane, P.C.

(57) ABSTRACT

A device includes a mechanical stabilization system is used in image signal processing. The mechanical image stabilization system has an operating bandwidth and includes a motor to control an orientation of an image sensor. A processing apparatus of the device determines a temperature of the motor and adjusts a cutoff frequency of the operating bandwidth based on the temperature of the motor.

20 Claims, 12 Drawing Sheets

Related U.S. Application Data continuation of application No. 17/526,791, filed on Nov. 15, 2021, now Pat. No. 11,678,054, which is a continuation of application No. 17/175,538, filed on Feb. 12, 2021, now Pat. No. 11,178,329, which is a continuation of application No. 16/696,043, filed on Nov. 26, 2019, now Pat. No. 10,924,674, which is a continuation of application No. 15/915,763, filed on Mar. 8, 2018, now Pat. No. 10,491,824.

(60) Provisional application No. 62/614,140, filed on Jan. 5, 2018, provisional application No. 62/563,224, filed on Sep. 26, 2017.

(51) Int. Cl.
*G02B 27/64* (2006.01)
*H04N 23/60* (2023.01)
*H04N 23/695* (2023.01)

(52) U.S. Cl.
CPC ....... *H04N 23/6812* (2023.01); *H04N 23/687* (2023.01); *H04N 23/695* (2023.01)

(58) Field of Classification Search
CPC ............. H04N 5/23248; H04N 5/2327; H04N 5/2353; H04N 5/2351; H04N 5/23287; H04N 5/2254; H04N 13/0239; H04N 13/0296; H04N 13/0253; H04N 13/0059; H04N 7/18; H04N 7/185; G02B 27/646; B64D 47/08; B64C 39/024; B64C 2201/127; B64C 2201/146; G03B 15/006; G03B 17/561; F16M 11/123; F16M 11/041; F16M 11/10; F16M 11/18; F16M 11/2071; G06T 15/205; G06T 19/006
USPC ....................................................... 348/208.2
See application file for complete search history.

(56) References Cited

U.S. PATENT DOCUMENTS

| | | | |
|---|---|---|---|
| 7,643,063 B2 | 1/2010 | Trescott | |
| 7,932,925 B2 | 4/2011 | Inbar | |
| 8,169,487 B2 | 5/2012 | Noguchi | |
| 8,803,983 B2 | 8/2014 | Miyazawa | |
| 8,861,947 B2 | 10/2014 | Webb | |
| 8,908,090 B2 | 12/2014 | Webb | |
| 9,143,686 B2 | 9/2015 | Lee | |
| 9,144,714 B2 | 9/2015 | Hollinger | |
| 9,239,468 B2 | 1/2016 | Webb | |
| 9,277,130 B2 | 3/2016 | Wang | |
| 9,360,740 B2 | 6/2016 | Wagner | |
| 9,387,927 B2 | 7/2016 | Rischmuller | |
| 9,436,181 B2 | 9/2016 | Peeters | |
| 9,574,703 B2 | 2/2017 | Firchau | |
| 9,692,972 B2 | 6/2017 | Karpenko | |
| 9,777,887 B2 | 10/2017 | Pan | |
| 9,859,938 B2 | 1/2018 | Piccioni | |
| 9,863,171 B1 | 1/2018 | Salter | |
| 9,874,308 B2 | 1/2018 | Saika | |
| 9,903,533 B2 | 2/2018 | Wei | |
| 9,904,149 B2* | 2/2018 | Casarez | F16M 11/18 |
| D814,545 S | 4/2018 | Kim | |
| 10,008,028 B2 | 6/2018 | Zuccarino | |
| D822,754 S | 7/2018 | Fang | |
| D824,882 S | 8/2018 | Zheng | |
| D826,310 S | 8/2018 | Wang | |
| 10,091,432 B2 | 10/2018 | Mukunashi | |
| 10,129,478 B2 | 11/2018 | Zhao | |
| 10,136,035 B2 | 11/2018 | Pan | |
| D836,699 S | 12/2018 | Kim | |
| 10,150,576 B2 | 12/2018 | Saika | |
| 10,274,127 B2 | 4/2019 | Wei | |
| D849,107 S | 5/2019 | Huang | |
| 10,303,945 B2 | 5/2019 | Aoyama | |
| 10,395,428 B2 | 8/2019 | Stafford | |
| 10,410,320 B2 | 9/2019 | Taylor | |
| 10,416,669 B2 | 9/2019 | Rico | |
| D863,411 S | 10/2019 | Liao | |
| 10,455,158 B2 | 10/2019 | Ristroph | |
| 10,458,596 B2 | 10/2019 | Tian | |
| 10,491,824 B2 | 11/2019 | Enke | |
| 10,547,773 B2 | 1/2020 | Niemeyer | |
| D874,539 S | 2/2020 | Wang | |
| D879,175 S | 3/2020 | Matsumoto | |
| 10,582,259 B2 | 3/2020 | Enke | |
| 10,696,414 B2* | 6/2020 | Woodman | B64D 27/40 |
| 10,735,653 B1 | 8/2020 | Huang | |
| 10,827,123 B1 | 11/2020 | Flanigan | |
| 10,924,674 B2 | 2/2021 | Enke | |
| 10,966,798 B2 | 4/2021 | Tesar | |
| 11,178,329 B2 | 11/2021 | Enke | |
| D943,016 S | 2/2022 | Li | |
| 11,277,568 B2 | 3/2022 | Ito | |
| 11,678,054 B2 | 6/2023 | Enke | |
| 11,936,982 B2 | 3/2024 | Enke | |
| 2001/0013890 A1 | 8/2001 | Narayanaswami | |
| 2005/0243173 A1 | 11/2005 | Levine | |
| 2009/0219402 A1 | 9/2009 | Schneider | |
| 2010/0110203 A1 | 5/2010 | Noguchi | |
| 2011/0221900 A1 | 9/2011 | Reich | |
| 2012/0180789 A1 | 7/2012 | Tobia | |
| 2012/0268614 A1 | 10/2012 | Webb | |
| 2013/0088610 A1 | 4/2013 | Lee | |
| 2013/0162847 A1 | 6/2013 | Miyazawa | |
| 2013/0210563 A1 | 8/2013 | Hollinger | |
| 2014/0024999 A1 | 1/2014 | Levien | |
| 2014/0263823 A1 | 9/2014 | Wang | |
| 2014/0368911 A1 | 12/2014 | Becker | |
| 2015/0085149 A1 | 3/2015 | Tsubaki | |
| 2015/0094883 A1 | 4/2015 | Peeters | |
| 2015/0097950 A1 | 4/2015 | Wang | |
| 2015/0149000 A1 | 5/2015 | Rischmuller | |
| 2015/0261070 A1* | 9/2015 | Feng | G03B 17/561 |
| | | | 396/421 |
| 2015/0304652 A1 | 10/2015 | Spas | |
| 2015/0346722 A1* | 12/2015 | Herz | G01S 19/13 |
| | | | 701/2 |
| 2015/0350543 A1 | 12/2015 | Hollinger | |
| 2015/0381891 A1 | 12/2015 | Karpenko | |
| 2016/0033077 A1 | 2/2016 | Chen | |
| 2016/0201847 A1 | 7/2016 | Firchau | |
| 2016/0261784 A1 | 9/2016 | Mukunashi | |
| 2016/0352992 A1 | 12/2016 | Saika | |
| 2016/0360111 A1 | 12/2016 | Thivent | |
| 2016/0381271 A1 | 12/2016 | Cheng | |
| 2017/0006340 A1 | 1/2017 | Enke | |
| 2017/0036771 A1* | 2/2017 | Woodman | B64C 25/10 |
| 2017/0037995 A1 | 2/2017 | Pan | |
| 2017/0041652 A1 | 2/2017 | Ko | |
| 2017/0064176 A1 | 3/2017 | Kim | |
| 2017/0108168 A1 | 4/2017 | Pan | |
| 2017/0134631 A1 | 5/2017 | Zhao | |
| 2017/0143442 A1 | 5/2017 | Tesar | |
| 2017/0146892 A1* | 5/2017 | Wei | G03B 17/563 |
| 2017/0159875 A1 | 6/2017 | Wagner | |
| 2017/0178392 A1 | 6/2017 | Zuccarino | |
| 2017/0192341 A1* | 7/2017 | Casarez | F16M 11/123 |
| 2017/0222676 A1 | 8/2017 | Piccioni | |
| 2017/0227162 A1 | 8/2017 | Saika | |
| 2017/0241589 A1 | 8/2017 | Wang | |
| 2017/0307136 A1 | 10/2017 | Wei | |
| 2017/0351900 A1 | 12/2017 | Lee | |
| 2017/0358141 A1 | 12/2017 | Stafford | |
| 2018/0025498 A1 | 1/2018 | Omari | |
| 2018/0035020 A1 | 2/2018 | Pan | |
| 2018/0059665 A1 | 3/2018 | Shin | |
| 2018/0079529 A1 | 3/2018 | Saika | |
| 2018/0081148 A1 | 3/2018 | Tomita | |
| 2018/0093638 A1 | 4/2018 | Piccioni | |
| 2018/0093768 A1 | 4/2018 | Castleman | |
| 2018/0094931 A1 | 4/2018 | Taylor | |

(56) References Cited

U.S. PATENT DOCUMENTS

| | | |
|---|---|---|
| 2018/0095433 A1 | 4/2018 | Rico |
| 2018/0096455 A1 | 4/2018 | Taylor |
| 2018/0194488 A1 | 7/2018 | Zhao |
| 2018/0255247 A1 | 9/2018 | Ristroph |
| 2018/0321328 A1 | 11/2018 | Kushleyev |
| 2018/0322699 A1* | 11/2018 | Gray ............... G06T 19/003 |
| 2018/0352144 A1 | 12/2018 | Miao |
| 2018/0367740 A1 | 12/2018 | Ito |
| 2019/0008256 A1 | 1/2019 | Basham |
| 2019/0098191 A1 | 3/2019 | Enke |
| 2020/0169654 A1 | 5/2020 | Enke |
| 2021/0168272 A1 | 6/2021 | Enke |
| 2022/0078322 A1 | 3/2022 | Enke |
| 2023/0308761 A1 | 9/2023 | Enke |

FOREIGN PATENT DOCUMENTS

| | | |
|---|---|---|
| CN | 102355574 A | 2/2012 |
| CN | 103064430 A | 4/2013 |
| EP | 3139239 A1 | 3/2017 |
| JP | 2002051118 A | 2/2002 |
| WO | 0235824 A1 | 5/2002 |
| WO | 2017035840 A1 | 3/2017 |
| WO | 2018027340 | 2/2018 |

OTHER PUBLICATIONS

Film Like a Pro: DJI Drone "Active Track"—With Video Tutorials, DJI, Dec. 18, 2017, https://store.dji.com/guides/ film-like-a-pro-with-activetrack/ (Year: 2017) (12 pages).

International Preliminary Report on Patentability and Written Opinion for App. No. PCT/US2019/012253, dated Jul. 7, 2020, 10 pages.

International Search Report and Written Opinion for Application No. PCT/US 2019/012253, date of mailing Mar. 25, 2019, 14 pages.

Karma Grip Let's Get Started retrieved on Feb. 21, 2018 from URL https://gopro.com/content/dam/help/karma/karma-grip-quick-start-guides/Karma-Grip_QSG_HERO5_ENG_REVA.pdf (7 pages).

Osmo—Reimagine Movement—DJI retrieved on Feb. 21, 2018 from URL https://www.dji.com/osmo (11 pages).

Rick Miller et al.: "Gimbal system configurations and line-of-sight control techniques for small UAV applications", Proceedings of SPIE, vol. 8713, May 31, 2013 (May 31, 2013), p. 871308, XP044347865, US DOI: 10.1117/12.2015777, ISBN: 978-1-5106-1533-5.

U.S. Appl. No. 15/892,077, filed Feb. 8, 2018, Flanigan et al., 57 pages.

U.S. Appl. No. 15/934,204, filed Mar. 23, 2018, Enke et al., 81 pages.

YI Action Gimbal | YI Technology retrieved on Feb. 21, 2018 from URL https://www.yitechnology.com/yi-action-gimbal (18 pages).

* cited by examiner

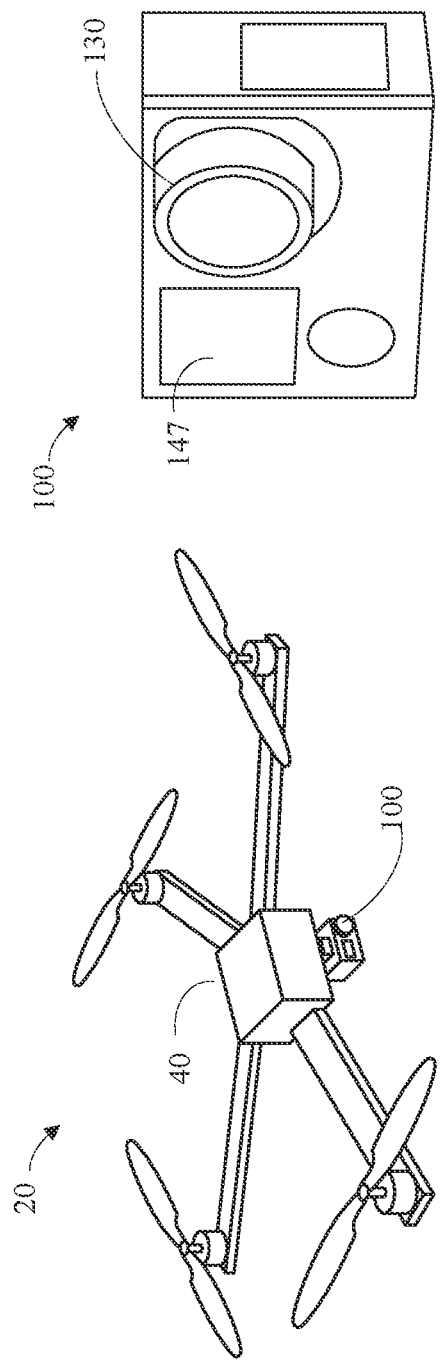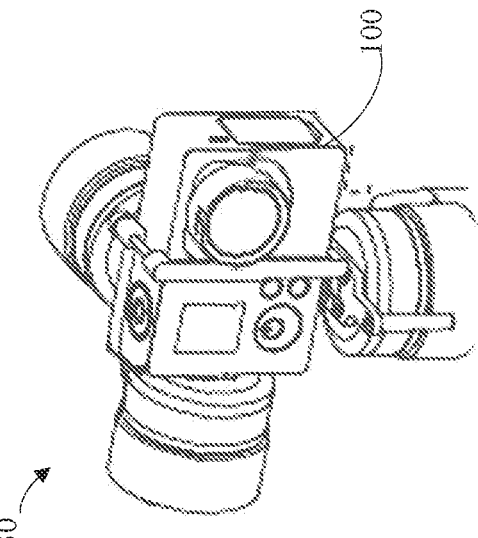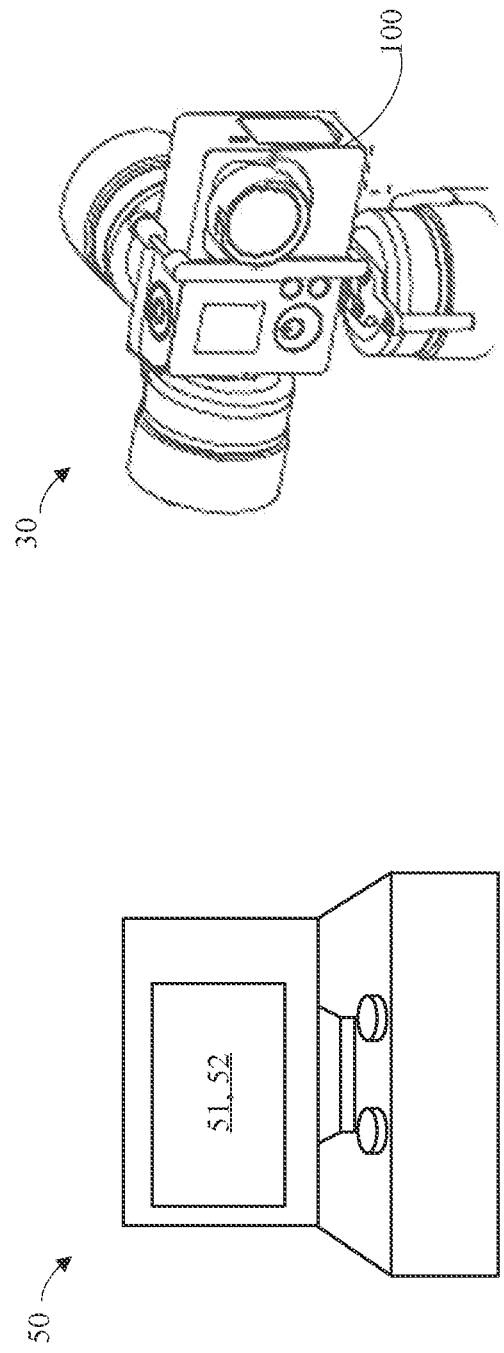

COMBINED MECHANICAL AND ELECTRONIC IMAGE STABILIZATION

CROSS REFERENCE TO RELATED APPLICATIONS

This application is a continuation of U.S. patent application Ser. No. 18/143,130, filed May 4, 2023, which is a continuation of U.S. patent application Ser. No. 17/526,791, filed Nov. 15, 2021, now U.S. Pat. No. 11,678,054, which is a continuation of U.S. patent application Ser. No. 17/175,538, filed Feb. 12, 2021, now U.S. Pat. No. 11,178,329, which is a continuation of U.S. patent application Ser. No. 16/696,043, filed Nov. 26, 2019, now U.S. Pat. No. 10,924,674, which is a continuation of U.S. patent application Ser. No. 15/915,763, filed Mar. 8, 2018, now U.S. Pat. No. 10,491,824, which claims the benefit of U.S. Provisional Application No. 62/614,140, filed Jan. 5, 2018, and U.S. Provisional Application No. 62/563,224, filed Sep. 26, 2017, the contents of which are incorporated by reference herein in their entirety.

TECHNICAL FIELD

This disclosure relates to image stabilization for image capture.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be stored and/or encoded. In some implementations, multiple images or video frames from different image sensors may include spatially adjacent or overlapping content, which may be stitched together to form a larger image with a larger field of view.

SUMMARY

Disclosed herein are implementations of image stabilization for image capture.

In a first aspect, the subject matter described in this specification can be embodied in systems that include an image sensor configured to capture an image; a mechanical stabilization system, including motors, configured to control an orientation of the image sensor to reject motions occurring within a first operating bandwidth with an upper cutoff frequency; and an electronic image stabilization module configured to correct images for rotations of the image sensor occurring within a second operating bandwidth with a lower cutoff frequency to obtain a stabilized image, wherein the lower cutoff frequency is greater than the upper cutoff frequency.

In a second aspect, the subject matter described in this specification can be embodied in methods that include determining a sequence of orientation estimates based on sensor data from one or more motion sensors; based on the sequence of orientation estimates, invoking a mechanical stabilization system to reject motions of an image sensor occurring within a first operating bandwidth with an upper cutoff frequency; receiving an image from the image sensor; based on the sequence of orientation estimates, invoking an electronic image stabilization module to correct the image for rotations of the image sensor occurring within a second operating bandwidth with a lower cutoff frequency to obtain a stabilized image, wherein the lower cutoff frequency is greater than the upper cutoff frequency; and storing, displaying, or transmitting an output image based on the stabilized image.

In a third aspect, the subject matter described in this specification can be embodied in systems that include an image sensor configured to capture an image; one or more motion sensors configured to detect motion of the image sensor; a mechanical stabilization system, including gimbals and motors, configured to control an orientation of the image sensor; and an electronic image stabilization module configured to correct images for rotations of the image sensor. The systems include a processing apparatus configured to determine a sequence of orientation estimates based on sensor data from the one or more motion sensors; based on the sequence of orientation estimates, invoke the mechanical stabilization system to reject motions occurring within a first operating bandwidth with an upper cutoff frequency; receive the image from the image sensor; based on the sequence of orientation estimates, invoke the electronic image stabilization module to correct the image for rotations of the image sensor occurring within a second operating bandwidth with a lower cutoff frequency to obtain a stabilized image, wherein the lower cutoff frequency is greater than the upper cutoff frequency; and store, display, or transmit an output image based on the stabilized image.

In a fourth aspect, an image capture device may include an image sensor, a motion tracking module, a filter, and an electronic image stabilization module. The image sensor may be configured to obtain images. The motion tracking module may be configured to determine a sequence of orientation estimates based on sensor data. The filter may be configured to filter the sensor data with a pass band matching an operating bandwidth to the sequence of orientation estimates to obtain filtered data. The electronic image stabilization module may be configured to correct the images based on the filtered data.

In a fifth aspect, a method may include determining a sequence of orientation estimates based on sensor data from one or more motion sensors. The method may include receiving an image from an image sensor. The method may include filtering the sensor data with a pass band matching an operating bandwidth to the sequence of orientation estimates to obtain filtered data. The method may include invoking an electronic stabilization module to correct the image based on the filtered data to obtain a stabilized image. The method may include storing, displaying, or transmitting an output image based on the stabilized image.

In a sixth aspect, a method may include determining a temperature of an image capture device. The method may include adjusting cutoff frequencies based on the temperature. the method may include determining a state of charge of a battery of the image capture device. The method may include adjusting the cutoff frequencies based on the state of charge of the battery.

In a seventh aspect, a device may include a mechanical stabilization system, and a processing apparatus. The mechanical stabilization system may have a first operating bandwidth. The mechanical stabilization system may include a motor configured to control an orientation of an image sensor. The processing apparatus may be configured to determine a temperature of the motor. The processing apparatus may be configured to adjust a cutoff frequency of the first operating bandwidth based on the temperature of the motor.

In an eighth aspect, a method may include receiving an image from an image sensor. The method may include filtering sensor data from one or more motion sensors with a pass band matching an operation bandwidth to the sequence of orientation estimates to obtain filtered data. The method may include invoking an electronic image stabilization system to correct the image based on the filtered data to obtain a stabilized image. The method may include storing an output image based on the stabilized image.

In a ninth aspect, a device may include a mechanical stabilization system, a battery, and a processing apparatus. The mechanical stabilization system may have a first operating bandwidth. The mechanical stabilization system may include a motor configured to control an orientation of an image sensor. The battery may be configured to supply power to the motor. The processing apparatus may be configured to determine a state of charge of the battery. The processing apparatus may be configured to adjust a cutoff frequency of the first operating bandwidth based on the state of charge of the battery.

These and other aspects of the present disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 2A is a pictorial illustration of a movable imaging assembly.

FIG. 2B is a pictorial illustration of the imaging device.

FIG. 2C is a pictorial illustration of a movable imaging assembly controller and user interface.

FIG. 2D is a pictorial illustration of the imaging device of FIG. 2B within a movement mechanism.

DETAILED DESCRIPTION

Figure 1:
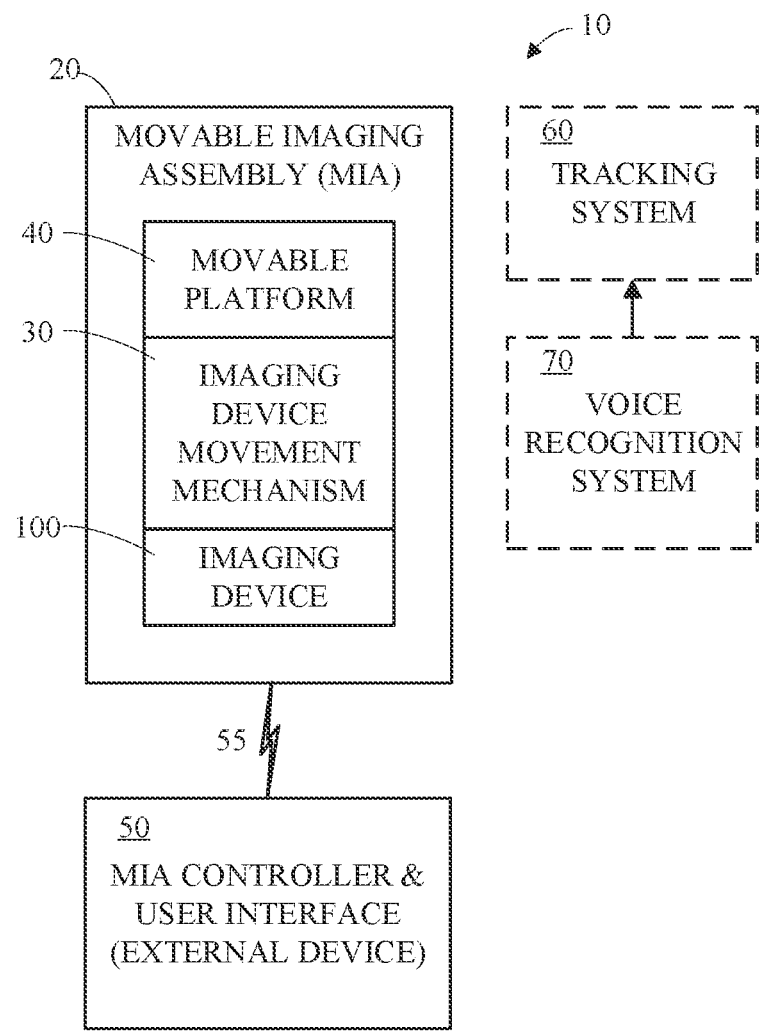
FIG. 1 is a block diagram of a movable imaging system and high-level components.

This document includes disclosure of systems, apparatus, and methods for image capture with combined mechanical and electronic image stabilization. Electronic image stabilization (EIS) and mechanical stabilization systems (MSS) attempt to solve the same problem using similar data. Typical implementations do not operate properly at the same time. Typical electronic image stabilization modules may use gyroscope data to correct for camera rotational motion around the X, Y, and, Z axis of the camera frame. Typical mechanical stabilization systems may use gyroscope and/or accelerometer data as well as optionally magnetometer, barometer, and global positioning system data to reject roll motion in X, Y, and Z axis of a gimbal frame as well as translational motion in X, Y, And Z axis in the gimbal frame. A mechanical stabilization system may be configured to reject motion while electronic image stabilization module corrects motion artifacts in a captured image (e.g., a frame of video). A mechanical stabilization system works in the gimbal frame of reference (which may be different for each axis) while an electronic image stabilization module works on the camera frame of reference.

A mechanical stabilization system may reject motion within some operating bandwidth, which may extend from a lower cutoff frequency, MSS_L_CF, to an upper cutoff frequency, MSS_U_CF. An electronic image stabilization module will reject motion within some operating bandwidth, which may extend from a lower cutoff frequency, EIS_L_CF, to an upper cutoff frequency, EIS_U_CF.

Using both a mechanical stabilization system and an electronic image stabilization module simultaneously in the same image capture system may lead to interference between the dynamics of the two systems, which may actually degrade image (e.g., video quality). Another problem is that a mechanical stabilization system may require high power consumption and drain a battery of an image capture system. Another problem is that an electronic image stabilization module may be computationally complex and consume significant computing resources (e.g., processor cycles or memory). Another problem is that a mechanical stabilization system typically has motors that can overheat when too much power is consumed.

A technique is proposed where the operation of both a mechanical stabilization system and an electronic image stabilization module is altered by altering the control response of each system. Adaptive controllers can throttle the bandwidth. To improve power usage the mechanical stabilization system, its operating bandwidth can be limited such that it does not overlap with the operating bandwidth of the electronic image stabilization module. To conserve computing resources, the operating bandwidth of the electronic image stabilization module can be limited such that it does not overlap with the operating bandwidth of the mechanical stabilization system. An image capture system may dynamically adapt the allocation of operating bandwidth between mechanical stabilization system and the electronic image stabilization module to improve system performance (e.g., to improve thermal performance and/or battery life performance). For example, operating bandwidths can be adjusted in a complimentary manner to limit the operating bandwidth of the mechanical stabilization system when motors start to heat up and compensate by increasing the operating bandwidth of the electronic image stabilization module to cover the operating bandwidth gap. Adjustment of the operating bandwidth allocation between the between mechanical stabilization system and the electronic image stabilization module can be a user selectable feature or adjusted automatically.

Implementations are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIG. 1 is a block diagram of a movable imaging system 10 and high-level components. The movable imaging system 10 may have two primary components: a movable imaging assembly 20 (MIA) and an external device 50, such as an MIA controller with a user interface. These components may be communicatively connected via a link 55. The link 55 may be wireless or wired. Other components may also be included within the movable imaging system 10. For example, the movable imaging assembly 20 may comprise an imaging device 100, such as a camera (as used herein, the term "camera" is defined broadly to include any form of imaging device) that can be used to capture still and video images. The movable imaging assembly 20 may include a movable platform 40 that can be moved positionally and/or rotationally with respect to a fixed reference ground. The movable imaging assembly 20 may also include a movement mechanism 30 that allows the imaging device 100 to move positionally and/or rotationally with respect to the movable platform 40.

In some implementations, the external device 50 may correspond to a smartphone, a tablet computer, a phablet, a smart watch, a portable computer, and/or another device configured to receive user input and communicate information with the imaging device 100, movement mechanism 30, and/or movable platform 40 individually, or with the movable imaging assembly 20 as a whole.

In one or more implementations, the link 55 may utilize any wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, the link 55 may be effectuated using a wired interface, e.g., HDMI, USB, digital video interface, display port interface (e.g., digital display interface developed by the Video Electronics Standards Association (VESA), Ethernet, Thunderbolt), and/or other interface.

The UI of the external device 50 may operate a software application (e.g., GoPro Studio®, GoPro App®, and/or other application) configured to perform a variety of operations related to camera configuration, control of video acquisition, and/or display of video captured by the imaging device 100. An application (e.g., GoPro App)® may enable a user to create short video clips and share video clips to a cloud service (e.g., Instagram®, Facebook®, YouTube®, Dropbox®); perform full remote control of imaging device 100 functions; live preview video being captured for shot framing; mark key moments while recording (e.g., HiLight Tag®, View HiLight Tags in GoPro Camera Roll®) for location and/or playback of video highlights; wirelessly control camera software; and/or perform other functions. Various methodologies may be utilized for configuring the imaging device 100 and/or displaying the captured information.

By way of an illustration, the UI of the external device 50 may receive a user setting characterizing image resolution (e.g., 3840 pixels by 2160 pixels), frame rate (e.g., 60 frames per second (fps)), and/or other settings (e.g., location) related to an activity (e.g., mountain biking) being captured by the user. The UI of the external device 50 may communicate these settings to the imaging device 100 via the link 55.

A user may utilize the UI of the external device 50 to view content acquired by the imaging device 100. A display of the UI of the external device 50 may act as a viewport into a 3D space of the content. In some implementations, the UI of the external device 50 may communicate additional information (e.g., metadata) to the imaging device 100. By way of an illustration, the UI of the external device 50 may provide orientation of the UI of the external device 50 with respect to a given coordinate system to the imaging device 100 to enable determination of a viewport location or dimensions for viewing of a portion of the panoramic content, or both. By way of an illustration, a user may rotate (sweep) the UI of the external device 50 through an arc in space. The UI of the external device 50 may communicate display orientation information to the imaging device 100 using a communication interface such as link 55. The imaging device 100 may provide an encoded bitstream configured to enable viewing of a portion of the content corresponding to a portion of the environment of the display location as the imaging device 100 traverses the path. Accordingly, display orientation information sent from the UI of the external device 50 to the imaging device 100 allows user selectable viewing of captured image and/or video.

In many instances, it is desirable to track a target (which may include one or more subjects) with the movable imaging assembly 20. Various forms of tracking may be utilized, including those discussed below and in U.S. Provisional Patent Application Ser. No. 62/364,960, filed Jul. 21, 2016, and herein incorporated by reference in its entirety. A tracking system 60 may be utilized to implement the described forms of tracking. The tracking system 60 may comprise a processor and algorithms that are used for tracking the target. The tracking system 60 is shown in dashed lines since it may be included entirely within the movable imaging assembly 20 or entirely within the external device 50, or portions of the tracking system 60 may be located or duplicated within each of the movable imaging assembly 20 and the external device 50. A voice recognition system 70 may also be utilized to interact with the tracking system 60 and issue commands (e.g., commands identifying or adjusting a target).

FIGS. 2A-2D are pictorial illustrations of implementations of the components shown in FIG. 1.

FIG. 2A is a pictorial illustration of the movable imaging assembly 20. In the example implementation shown, the movable imaging assembly 20 includes a movable platform 40 that is a quadcopter drone. The movable imaging assembly 20 could be any form of an aerial vehicle or any form of movable device that is movable with respect to a fixed ground, which could include movable mechanical systems that are tied to the earth. As shown in FIG. 2A, the imaging device 100 is mounted in the front of the movable platform 40 so that it points in a direction along an axis of the movable platform 40. However, in various implementations, the mounting of the imaging device 100 to the movable platform 40 is done using the movement mechanism 30.

FIG. 2B is a pictorial illustration of the imaging device 100. In FIG. 2B, the imaging device 100 is a GoPro Hero4® camera, however any type of imaging device 100 may be utilized. The imaging device 100 may include a video camera device. FIG. 2B also shows a lens 130 of the camera, along with a display screen 147.

FIG. 2C is a pictorial illustration of an external device 50, specifically, an MIA controller and user interface. The user interface may further comprise a display system 51 with a display device 52. The MIA controller may further comprise a communications interface via which it may receive commands both for operation of the movable platform 40, such as the UAV or drone, and operation of the imaging device 100. The commands can include movement commands, configuration commands, and other types of operational control commands.

FIG. 2D is a pictorial illustration of the imaging device 100 of FIG. 2B within the movement mechanism 30. The movement mechanism 30 couples the imaging device 100 to the movable platform 40. The implementation of the movement mechanism 30 shown in FIG. 2D is a three-axis gimbal mechanism that permits the imaging device 100 to be rotated about three independent axes. However, the movement mechanism 30 may include any type of translational and/or rotational elements that permit rotational and/or translational movement in one, two, or three dimensions.

Figures 3A, 3B:
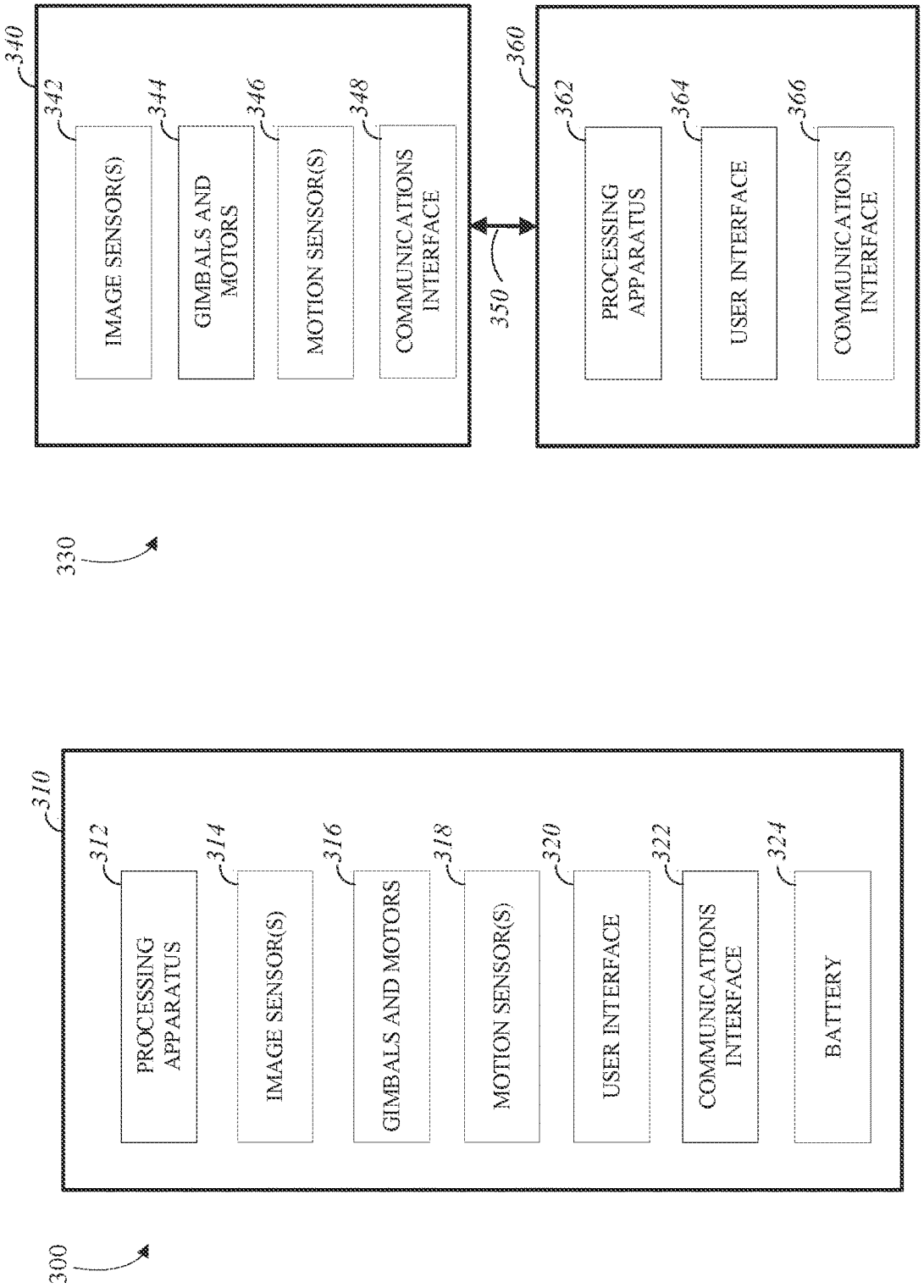
FIG. 3A is a block diagram of an example of a system configured for image capture with image stabilization.
FIG. 3B is a block diagram of an example of a system configured for image capture with image stabilization.

FIG. 3A is a block diagram of an example of a system 300 configured for image capture with image stabilization. The system 300 includes an image capture device 310 (e.g., a camera or a drone) that includes a processing apparatus 312 that is configured to receive images from one or more image sensors 314. The image capture device 310 includes gimbals and motors 316 that are actuators of a mechanical stabilization system configured to control an orientation of the one or more image sensors 314 (e.g., an orientation with respect to a movable platform). The gimbals and motors 316 may be controlled by a controller of the mechanical stabilization system, which may be implemented by the processing apparatus 312 (e.g., as a software module or a specialized hardware module). The processing apparatus 312 may be configured to perform image signal processing (e.g., filtering, tone mapping, stitching, and/or encoding) to generate output images based on image data from the image sensor 314. The processing apparatus 312 may include an electronic image stabilization module (e.g., implemented as a software module or a specialized hardware module) configured to correct images for rotations of the one or more image sensors 314. The image capture device 310 includes one or more motion sensors 318 configured to detect motion of the one or more image sensors 314. The one or more motion sensors 318 may provide feedback signals to the mechanical stabilization system and/or electronic image stabilization module. The image capture device 310 includes a communications interface 322 for transferring images to other devices. The image capture device 310 includes a user interface 320, which may allow a user to control image capture functions and/or view images. The image capture device 310 includes a battery 324 for powering the image capture device 310. For example, the system 300 may be used to implement processes described in this disclosure, such as the process 500 of FIG. 5 and the process 600 of FIG. 6.

The processing apparatus 312 may include one or more processors having single or multiple processing cores. The processing apparatus 312 may include memory, such as random access memory device (RAM), flash memory, or any other suitable type of storage device such as a non-transitory computer readable memory. The memory of the processing apparatus 312 may include executable instructions and data that can be accessed by one or more processors of the processing apparatus 312. For example, the processing apparatus 312 may include one or more DRAM modules such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor. In some implementations, the processing apparatus 312 may have multiple processing units in different portions the image capture device 310. For example, the processing apparatus 312 may include a processor on a movable platform (e.g., the movable platform 40) and a processor in an imaging device (e.g., the imaging device 100) that are connected by the gimbals and motors 316.

The processing apparatus 312 may include an electronic image stabilization module configured to correct images for rotations of an image sensor. For example, the electronic image stabilization module may implemented by software executed by the processing apparatus 312. The electronic image stabilization module may take sensor data (e.g., gyroscope data) and/or orientation estimates for the image sensor as input, determine a corrective rotation, and apply the corrective rotation to an image from the image sensor to obtain a stabilized image.

The one or more image sensors 314 are configured to capture images. The one or more image sensors 314 are configured to detect light of a certain spectrum (e.g., the visible spectrum or the infrared spectrum) and convey information constituting an image as electrical signals (e.g., analog or digital signals). For example, the one or more image sensors 314 may include charge-coupled devices (CCD) or active pixel sensors in complementary metal-oxide-semiconductor (CMOS). The one or more image sensors 314 may detect light incident through respective lens (e.g., a fisheye lens). In some implementations, the one or more image sensors 314 include digital to analog converters. In some implementations, the one or more image sensors 314 have respective fields of view that overlap.

The mechanical stabilization system for the one or more image sensors 314 includes the gimbals and motors 316. The gimbals and motors 316 may be parts of a movement mechanism (e.g., the movement mechanism 30). The gimbals and motors 316 may connect the one or more image sensors 314 to a moving platform and control their orientation. For example, the image capture device 310 may include a drone that is coupled to a housing of the image sensor(s) 314 by the gimbals of the mechanical stabilization system. The gimbals and motors 316 may span multiple axes (e.g., a 3-axis gimbal set with brushless direct current motors). The mechanical stabilization system may include a controller (e.g., a proportional integral derivative (PID) controller). For example, the controller of the mechanical stabilization system may be implemented by the processing apparatus 312 (e.g., as a software module or a specialized hardware module).

The one or more motion sensors 318 are configured to detect motion of the one or more image sensors 314. For example, the one or more motion sensors 318 may include parts of an inertial measurement unit (e.g., including gyroscopes, accelerometers, and/or magnetometers) that is mounted in a housing with the one or more image sensors 314. In some implementations, the one or more motion sensors 318 may include parts of an inertial measurement unit that is mounted in a movable platform of the image capture device 310. In some implementations, the one or more motion sensors 318 includes sensors (e.g., magnetic encoders, optical encoders, and/or potentiometers) that detect the state of the gimbals and motors 316 to measure a relative orientation of the image sensor and a movable platform of the image capture device 310. The processing apparatus 312 may be configured to determine a sequence of orientation estimates based on sensor data from the one or more motion sensors 318. For example, determining the sequence of orientation estimates may include applying quadratic estimation to sensor data from a plurality of the one or more motion sensors 318.

The processing apparatus 312 may be configured to invoke the mechanical stabilization system and the electronic image stabilization module in combination to mitigate distortion of captured images due to motion of the image capture device 310. The processing apparatus 312 may be configured to, based on the sequence of orientation estimates, invoke the mechanical stabilization system to reject motions occurring within a first operating bandwidth with an upper cutoff frequency. The processing apparatus 312 may be configured to, based on the sequence of orientation estimates, invoke the electronic image stabilization module to correct the image for rotations of the image sensor occurring within a second operating bandwidth with a lower cutoff frequency to obtain a stabilized image. The lower cutoff frequency may be greater than the upper cutoff frequency. Thus the first operating bandwidth and the second operating bandwidth may be non-overlapping so the mechanical stabilization system and the electronic image stabilization module can operate independently without substantial interference. In some implementations, the processing apparatus 312 may be configured to apply a first filter with a pass band matching the first operating bandwidth to the sequence of orientation estimates to obtain data that is input to the mechanical stabilization system; and apply a second filter with a pass band matching the second operating bandwidth to the sequence of orientation estimates to obtain data that is input to the electronic image stabilization module. For example, the first filter and the second filter may have transfer functions similar to those depicted in FIG. 7. By filtering the input to a mechanical stabilization system and an electronic image stabilization module that have linear controllers, the respective operating bandwidths for these subsystems may be enforced. In some implementations, the mechanical stabilization system includes a proportional integral derivative controller with coefficients tuned to enforce the first operating bandwidth. In some implementations, the electronic image stabilization module includes a proportional integral derivative controller with coefficients tuned to enforce the first operating bandwidth. The processing apparatus 312 may be configured to adjust the first operating bandwidth and the second operating bandwidth in a complimentary manner by adjusting the upper cutoff frequency and the lower cutoff frequency by a same amount. For example, the processing apparatus 312 may be configured to implement the process 600 of FIG. 6.

The image capture device 310 may include a user interface 320. For example, the user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The image capture device 310 may include a communications interface 322, which may enable communications with a personal computing device (e.g., a smartphone, a tablet, a laptop computer, or a desktop computer). For example, the communications interface 322 may be used to receive commands controlling image capture and processing in the image capture device 310. For example, the communications interface 322 may be used to transfer image data to a personal computing device. For example, the communications interface 322 may include a wired interface, such as a high-definition multimedia interface (HDMI), a universal serial bus (USB) interface, or a FireWire interface. For example, the communications interface 322 may include a wireless interface, such as a Bluetooth interface, a ZigBee interface, and/or a Wi-Fi interface.

The image capture device 310 may include a battery 324 that powers the image capture device 310 and/or its peripherals. For example, the battery 324 may be charged wirelessly or through a micro-USB interface.

FIG. 3B is a block diagram of an example of a system 330 configured for image capture with image stabilization. The system 330 includes an image capture device 340 and a personal computing device 360 that communicate via a communications link 350. The image capture device 340 includes one or more image sensors 342 that are configured to capture images. The image capture device 340 includes a communications interface 348 configured to transfer images via the communication link 350 to the personal computing device 360. The personal computing device 360 includes a processing apparatus 362 that is configured to receive, using the communications interface 366, images from the one or more image sensors 342. The image capture device 340 includes gimbals and motors 344 that are actuators of a mechanical stabilization system configured to control an orientation of the one or more image sensors 342 (e.g., an orientation with respect to a movable platform). The gimbals and motors 344 may be controlled by a controller of the mechanical stabilization system, which may be implemented by the processing apparatus 362 (e.g., as a software module or a specialized hardware module) and provide control signals to the motors 344 via the communication link 350. The processing apparatus 362 may be configured to perform image signal processing (e.g., filtering, tone mapping, stitching, and/or encoding) to generate output images based on image data from the one or more image sensors 342. The processing apparatus 362 may include an electronic image stabilization module (e.g., implemented as a software module or a specialized hardware module) configured to correct images for rotations of the one or more image sensors 342. The image capture device 340 includes one or more motion sensors 346 configured to detect motion of the one or more image sensors 342. The one or more motion sensors 346 may provide feedback signals (e.g., via communication link 350) to the mechanical stabilization system and/or electronic image stabilization module. For example, the system 330 may be used to implement processes described in this disclosure, such as the process 500 of FIG. 5 and the process 600 of FIG. 6.

The one or more image sensors 342 are configured to capture images. The one or more image sensors 342 are configured to detect light of a certain spectrum (e.g., the visible spectrum or the infrared spectrum) and convey information constituting an image as electrical signals (e.g., analog or digital signals). For example, the one or more image sensors 342 may include charge-coupled devices (CCD) or active pixel sensors in complementary metal-oxide-semiconductor (CMOS). The one or more image sensors 342 may detect light incident through respective lens (e.g., a fisheye lens). In some implementations, the one or more image sensors 342 include digital to analog converters. In some implementations, the one or more image sensors 342 have respective fields of view that overlap.

The processing apparatus 362 may include one or more processors having single or multiple processing cores. The processing apparatus 362 may include memory, such as random access memory device (RAM), flash memory, or any other suitable type of storage device such as a non-transitory computer readable memory. The memory of the processing apparatus 362 may include executable instructions and data that can be accessed by one or more processors of the processing apparatus 362. For example, the processing apparatus 362 may include one or more DRAM modules such as double data rate synchronous dynamic random-access memory (DDR SDRAM). In some implementations, the processing apparatus 362 may include a digital signal processor (DSP). In some implementations, the processing apparatus 362 may include an application specific integrated circuit (ASIC). For example, the processing apparatus 362 may include a custom image signal processor.

The processing apparatus 362 may include an electronic image stabilization module configured to correct images for rotations of an image sensor. For example, the electronic image stabilization module may implemented by software executed by the processing apparatus 362. The electronic image stabilization module may take sensor data (e.g., gyroscope data) and/or orientation estimates for the image sensor as input, determine a corrective rotation, and apply the corrective rotation to an image from the image sensor to obtain a stabilized image.

The mechanical stabilization system for the one or more image sensors 342 includes the gimbals and motors 344. The gimbals and motors 344 may be parts of a movement mechanism (e.g., the movement mechanism 30). The gimbals and motors 344 may connect the one or more image sensors 342 to a moving platform and control their orientation. For example, the image capture device 340 may include a drone that is coupled to a housing of the image sensor(s) 342 by the gimbals of the mechanical stabilization system. The gimbals and motors 344 may span multiple axes (e.g., a 3-axis gimbal set with brushless direct current motors). The mechanical stabilization system may include a controller (e.g., a proportional integral derivative (PID) controller). For example, the controller of the mechanical stabilization system may be implemented by the processing apparatus 362 (e.g., as a software module or a specialized hardware module).

The one or more motion sensors 346 are configured to detect motion of the one or more image sensors 342. For example, the one or more motion sensors 346 may include parts of an inertial measurement unit (e.g., including gyroscopes, accelerometers, and/or magnetometers) that is mounted in a housing with the one or more image sensors 342. In some implementations, the one or more motion sensors 346 may include parts of an inertial measurement unit that is mounted in a movable platform of the image capture device 340. In some implementations, the one or more motion sensors 346 include sensors (e.g., magnetic encoders, optical encoders, and/or potentiometers) that detect the state of the gimbals and motors 344 to measure a relative orientation of the image sensor and a movable platform of the image capture device 340. The processing apparatus 362 may be configured to determine a sequence of orientation estimates based on sensor data from the one or more motion sensors 346. For example, determining the sequence of orientation estimates may include applying quadratic estimation to sensor data from a plurality of the one or more motion sensors 346.

The processing apparatus 362 may be configured to invoke the mechanical stabilization system and the electronic image stabilization module in combination to mitigate distortion of captured images due to motion of the image capture device 340. The processing apparatus 362 may be configured to, based on the sequence of orientation estimates, invoke the mechanical stabilization system to reject motions occurring within a first operating bandwidth with an upper cutoff frequency. The processing apparatus 362 may be configured to, based on the sequence of orientation estimates, invoke the electronic image stabilization module to correct the image for rotations of the image sensor occurring within a second operating bandwidth with a lower cutoff frequency to obtain a stabilized image. The lower cutoff frequency may be greater than the upper cutoff frequency. Thus the first operating bandwidth and the second operating bandwidth may be non-overlapping so the mechanical stabilization system and the electronic image stabilization module can operate independently without substantial interference. In some implementations, the processing apparatus 362 may be configured to apply a first filter with a pass band matching the first operating bandwidth to the sequence of orientation estimates to obtain data that is input to the mechanical stabilization system; and apply a second filter with a pass band matching the second operating bandwidth to the sequence of orientation estimates to obtain data that is input to the electronic image stabilization module. For example, the first filter and the second filter may have transfer functions similar to those depicted in FIG. 7. By filtering the input to a mechanical stabilization system and an electronic image stabilization module that have linear controllers, the respective operating bandwidths for these subsystems may be enforced. In some implementations, the mechanical stabilization system includes a proportional integral derivative controller with coefficients tuned to enforce the first operating bandwidth. In some implementations, the electronic image stabilization module includes a proportional integral derivative controller with coefficients tuned to enforce the first operating bandwidth. The processing apparatus 362 may be configured to adjust the first operating bandwidth and the second operating bandwidth in a complimentary manner by adjusting the upper cutoff frequency and the lower cutoff frequency by a same amount. For example, the processing apparatus 362 may be configured to implement the process 600 of FIG. 6.

The communications link 350 may be a wired communications link or a wireless communications link. The communications interface 348 and the communications interface 366 may enable communications over the communications link 350. For example, the communications interface 348 and the communications interface 366 may include a high-definition multimedia interface (HDMI), a universal serial bus (USB) interface, a FireWire interface, a Bluetooth interface, a ZigBee interface, and/or a Wi-Fi interface. For example, the communications interface 348 and the communications interface 366 may be used to transfer image data from the image capture device 340 to the personal computing device 360 for image signal processing (e.g., filtering, tone mapping, stitching, and/or encoding) to generate output images based on image data from the one or more image sensors 342. For example, the communications interface 348 and the communications interface 366 may be used to transfer motion sensor data from the image capture device 340 to the personal computing device 360 for processing in a controller of a mechanical stabilization system and or an electronic image stabilization system. For example, the communications interface 348 and the communications interface 366 may be used to transfer control signals to the image capture device 340 from the personal computing device 360 for controlling the gimbals and motors 344 of a mechanical stabilization system.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, snap photograph, or select tracking target) received via the user interface 364 may be passed on to the image capture device 340 via the communications link 350.

Figure 4:
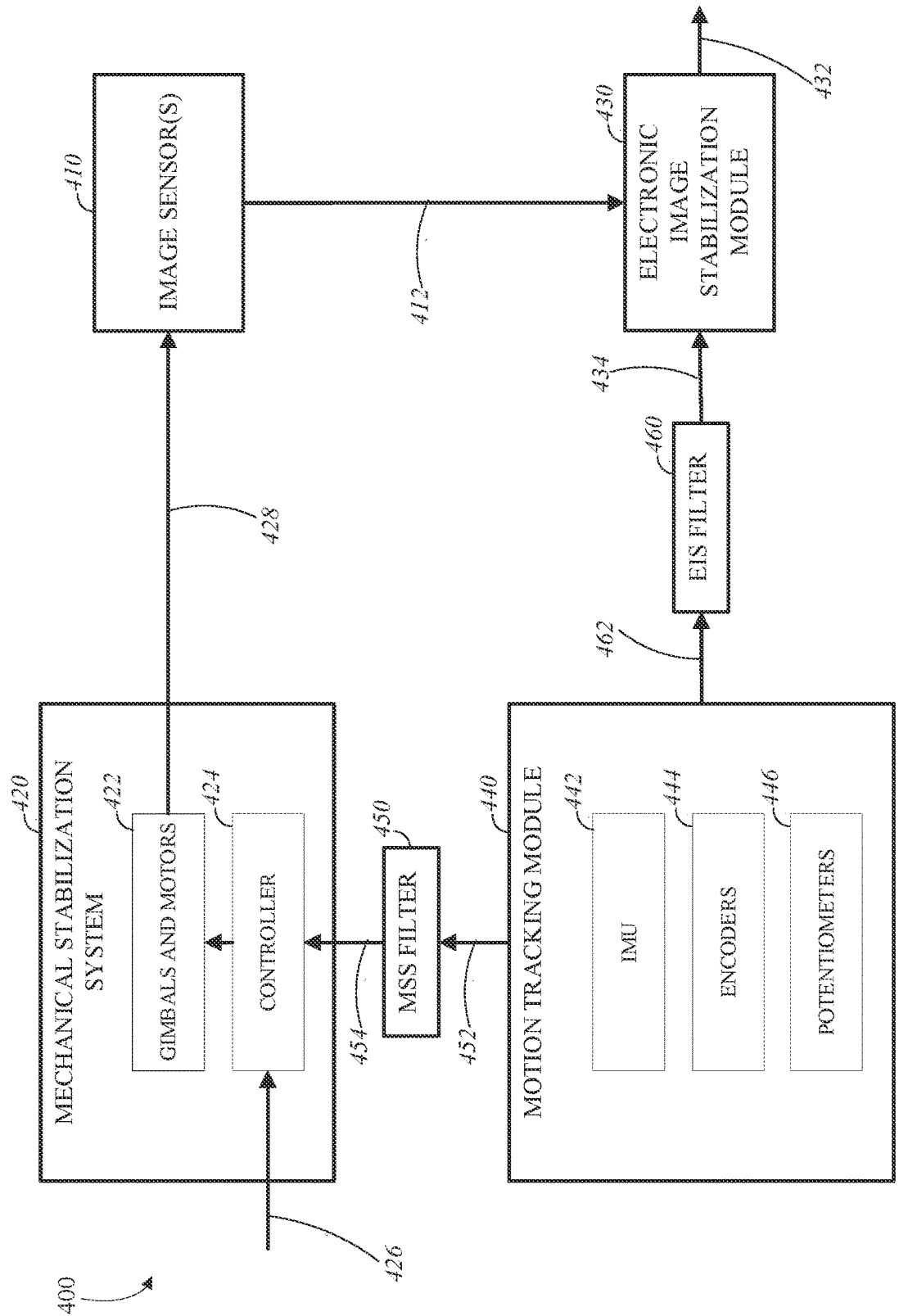
FIG. 4 is a block diagram of an example of a system configured for image capture with image stabilization.

FIG. 4 is a block diagram of an example of a system 400 configured for image capture with image stabilization. The system includes an image sensor 410 configured to capture an image; a mechanical stabilization system 420 configured to control an orientation of the image sensor 410; an electronic image stabilization module 430 configured to correct the image for rotations of the image sensor; and a motion tracking module 440 including one or more motion sensors configured to detect motion of the image sensor 410 and provide input to the mechanical stabilization system 420 and the electronic image stabilization module 430. The mechanical stabilization system 420 and the electronic image stabilization module 430 may be configured to operate in substantially non-overlapping respective bandwidths. For example, the system 400 may be used to implement processes described in this disclosure, such as the process 500 of FIG. 5 and the process 600 of FIG. 6.

The system 400 includes an image sensor 410 configured to capture an image 412. The image sensor 410 may be configured to detect light of a certain spectrum (e.g., the visible spectrum or the infrared spectrum) and convey information constituting an image as electrical signals (e.g., analog or digital signals). For example, the image sensor 410 may include charge-coupled devices (CCD) or active pixel sensors in complementary metal-oxide-semiconductor (CMOS). The image sensor 410 may detect light incident through a lens (e.g., a fisheye lens). In some implementations, the image sensor 410 includes a digital to analog converter.

The system 400 includes a mechanical stabilization system 420, including motors, configured to control an orientation of the image sensor to reject motions occurring within a first operating bandwidth with an upper cutoff frequency. In this example, the mechanical stabilization system 420 includes gimbals and motors 422 that are actuators used to control an orientation of the image sensor 410 (e.g., an orientation with respect to a movable platform). The gimbals and motors 422 may be parts of a movement mechanism (e.g., the movement mechanism 30). The gimbals and motors 422 may connect the image sensor 410 to a movable platform and control the orientation of the image sensor 410 with the movable platform. For example, the system 400 may include a drone (e.g., the movable platform 40) that is coupled to a housing of the image sensor 410 by the mechanical stabilization system 420. The gimbals and motors 422 may span multiple axes (e.g., a 3-axis gimbal set with brushless direct current motors). The mechanical stabilization system 420 may include a controller 424 (e.g., a proportional integral derivative (PID) controller). For example, the controller 424 of the mechanical stabilization system 420 may be implemented as a software module or a specialized hardware module (e.g., by the processing apparatus 312). The controller 424 may take targeting input 426 from a tracking system (e.g., the tracking system 60), such a set point or a desired orientation. The controller 424 may be configured to rejection motions occurring within the first operating bandwidth that deviate from a desired orientation (e.g., a current orientation). The gimbals and motors 422 are used to generate forces 428 (e.g., torques or displacements) to actuate control of an orientation and/or position of the image sensor 410. For example, the forces 428 may serve to keep the image sensor pointed steadily at target while a connected movable platform (e.g., a drone) is moving.

The system 400 includes an electronic image stabilization module 430 configured to correct images for rotations of the image sensor 410 occurring within a second operating bandwidth with a lower cutoff frequency to obtain a stabilized image 432. The lower cutoff frequency of the second operating bandwidth is greater than the upper cutoff frequency of the first operating bandwidth. Having substantially non-overlapping operating bandwidths may prevent or reduce interference between the dynamics of the mechanical stabilization system 420 and the dynamics of the electronic image stabilization module 430 and improve image quality of the stabilized image 432. For example, the electronic image stabilization module 430 may implemented by software executed by a processing apparatus (e.g., an image signal processor). The electronic image stabilization module 430 may take sensor data (e.g., gyroscope data) and/or orientation estimates for the image sensor as input 434, determine a corrective rotation, and apply the corrective rotation to the image 412 from the image sensor 410 to obtain a stabilized image 432. For example, certain higher frequency motions of the image sensor 410 (e.g., vibrations) may be too fast to be efficiently rejected by the mechanical stabilization system 420 and thus may cause distortion of the image 412. This remaining distortion may be corrected in whole or in part by digital image processing in the electronic image stabilization module 430.

The system 400 includes a motion tracking module 440 including one or more motion sensors configured to detect motion of the image sensor 410 and determine a sequence of orientation estimates for the image sensor 410. The motion tracking module 440 includes an inertial measurement unit 442 that can be used to detect changes in position and orientation of the image sensor 410. For example, the inertial measurement unit 442 may include a 3-axis accelerometer, a 3-axis gyroscope, and/or a 3-axis magnetometer. The motion tracking module 440 includes encoders 444 (e.g., magnetic encoders, optical encoders, and/or interferometric laser encoders) that can be used to detect a position and/or orientation of the image sensor 410 relative to movable platform (e.g., a drone) connected by the gimbals and motors 422. The motion tracking module 440 includes potentiometers 446 that detect a state of the gimbals and motors 422 and thus a position and/or orientation of the image sensor 410 relative to movable platform (e.g., a drone) connected by the gimbals and motors 422. The motion tracking module 440 may include a sensor fusion module for combining data from the various sensors of the motion tracking module to determine the sequence of estimates of the position and/or orientation of the image sensor 410. For example, determining the sequence of orientation estimates may include applying quadratic estimation to sensor data from the inertial measurement unit 442, the encoders 444 and/or the potentiometers 446.

The system 400 includes a first filter module 450 for the mechanical stabilization system 420. The first filter module 450 is configured to apply a first filter with a pass band matching the first operating bandwidth to a sequence of orientation estimates 452 to obtain data 454 that is input to mechanical stabilization system 420. For example, the first filter may have a transfer function similar to the transfer function 710 illustrated in FIG. 7. The first operating bandwidth for the mechanical stabilization system 420 may be configured by taking input data 454 from the first filter module 450, where the controller 424 is a linear system. It is worth noting that the first operating bandwidth configured by taking input data 454 from the first filter module 450 may be a narrower subset of a maximum operating bandwidth of the mechanical stabilization system 420 (e.g., limited by factors such as the maximum torque of the motors 422). In some implementations (not shown in FIG. 4), the first operating bandwidth of the mechanical stabilization system 420 is configured or enforced by tuning the controller 424. For example, the first filter module 450 may be implemented as software executed by a processing apparatus (e.g., the processing apparatus 312).

The system 400 includes a second filter module 460 for the electronic image stabilization module 430. The second filter module 460 is configured to apply a second filter with a pass band matching the second operating bandwidth to a sequence of orientation estimates 462 to obtain data that is input 434 to electronic image stabilization module 430. For example, the second filter may have a transfer function similar to the transfer function 720 illustrated in FIG. 7. The second operating bandwidth for the electronic image stabilization module 430 may be configured by taking input 434 from the second filter module 460, where a controller of the electronic image stabilization module 430 is a linear system. It is worth noting that the second operating bandwidth configured by taking input 434 from the second filter module 460 may be a narrower subset of a maximum operating bandwidth of the electronic image stabilization module 430 (e.g., limited by factors such as tuning of a controller). In some implementations (not shown in FIG. 4), the second operating bandwidth of the electronic image stabilization module 430 is configured or enforced by tuning a controller of the electronic image stabilization module 430. For example, the second filter module 460 may be implemented as software executed by a processing apparatus (e.g., the processing apparatus 312).

Figure 5:
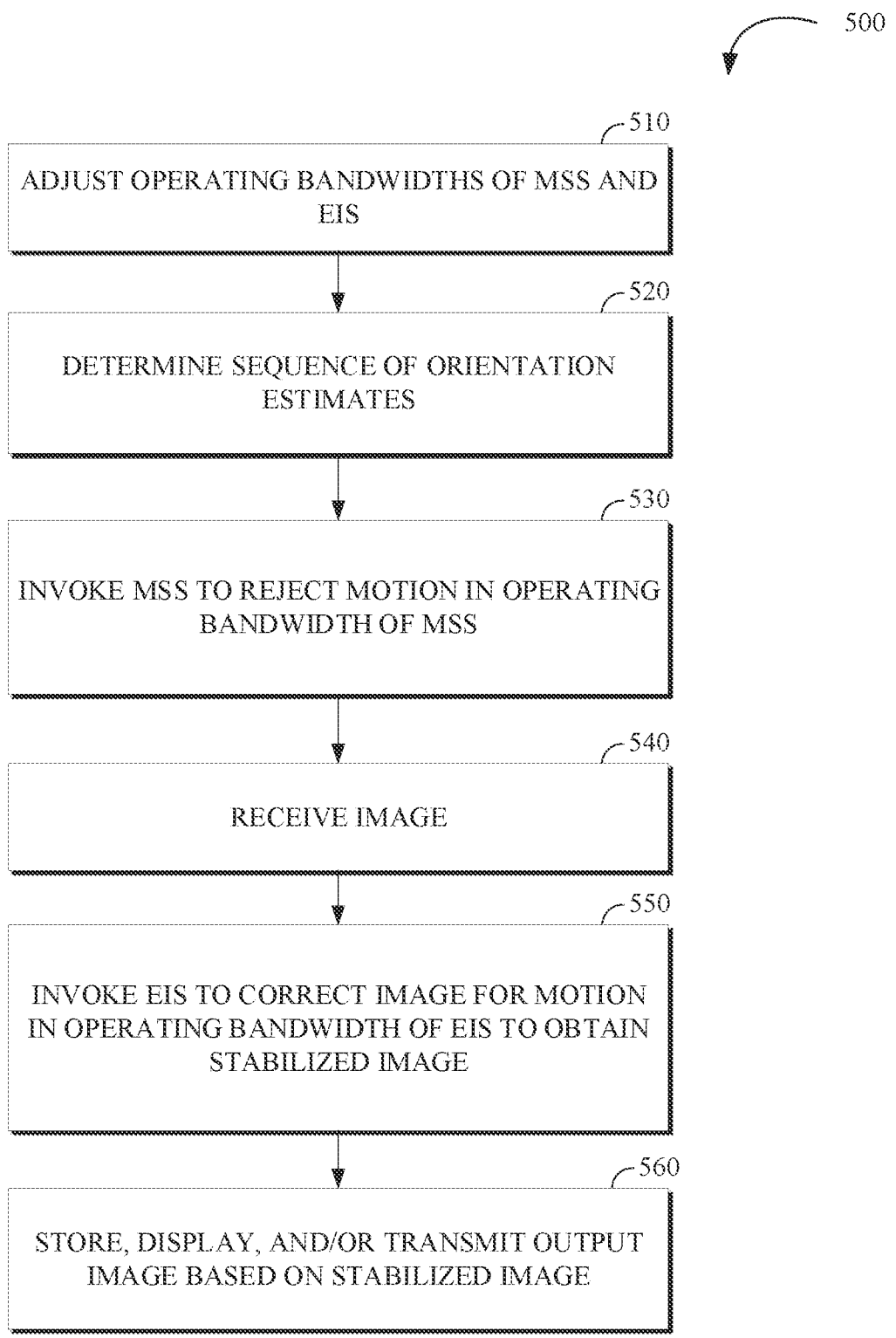
FIG. 5 is a flowchart of an example of a process for image capture with mechanical and electronic image stabilization.

FIG. 5 is a flowchart of an example of a process 500 for image capture with mechanical and electronic image stabilization. The process 500 includes adjusting 510 respective operating bandwidths of a mechanical stabilization system and an electronic image stabilization module in a complimentary manner; determining 520 a sequence of orientation estimates based on sensor data from one or more motion sensors; based on the sequence of orientation estimates, invoking 530 a mechanical stabilization system to reject motions of an image sensor occurring within a first operating bandwidth with an upper cutoff frequency; receiving 540 an image from the image sensor; based on the sequence of orientation estimates, invoking 550 an electronic image stabilization module to correct the image for rotations of the image sensor occurring within a second operating bandwidth with a lower cutoff frequency to obtain a stabilized image, wherein the lower cutoff frequency is greater than the upper cutoff frequency; and storing, displaying, or transmitting 560 an output image based on the stabilized image. For example, the process 500 may be implemented by the movable imaging system 10 of FIG. 1, the system 300 of FIG. 3A, the system 330 of FIG. 3B, or the system 400 of FIG. 4. For example, the process 500 may be implemented by an image capture device, such the image capture device 310 shown in FIG. 3A. For example, the process 500 may be implemented by a personal computing device, such as the personal computing device 360.

The process 500 includes adjusting 510 the first operating bandwidth and the second operating bandwidth in a complimentary manner by adjusting the upper cutoff frequency and the lower cutoff frequency by a same amount. The operating bandwidths of the two systems may be adjusted 510 to manage tradeoffs between costs and performance benefits of operating the mechanical stabilization system with a wide operating bandwidth. For example, running motors of the mechanical stabilization system with a wide operating bandwidth may consume more power and generate excessive heat. On the other hand, operating the mechanical stabilization system with a wide operating bandwidth may achieve better image quality than relying more on the electronic image stabilization module, which may be unable to correct some components of distortion (e.g., blurring) resulting from the motion of the image sensor. For example, the first operating bandwidth and the second operating bandwidth may be adjusted 510 dynamically based on a mode selection made by a user of an image capture device, a condition of the environment (e.g., low light, or high contrast), a temperature of the motors, and/or a state of charge of a battery of the image capture device. For example, the first operating bandwidth and the second operating bandwidth may be adjusted 510 by implementing the process 600 of FIG. 6. In some implementations, the first operating bandwidth and the second operating bandwidth may be adjusted 510 by changing filters applied to the motion signals input to the mechanical stabilization system and the electronic image stabilization module respectively. In some implementations, the first operating bandwidth and the second operating bandwidth may be adjusted 510 by tuning parameters (e.g., coefficients of a PID controller) of respective controllers of the mechanical stabilization system and the electronic image stabilization module.

The process 500 includes determining 520 a sequence of orientation estimates based on sensor data from one or more motion sensors (e.g., the one or more motion sensors 318). The one or more motion sensors may include an inertial measurement unit (e.g., the inertial measurement unit 442) that can be used to detect changes in position and orientation of the image sensor. The one or more motion sensors may include encoders (e.g., magnetic encoders, optical encoders, and/or interferometric laser encoders) that can be used to detect a position and/or orientation of the image sensor relative to movable platform (e.g., a drone) connected by the gimbals and motors of the mechanical stabilization system. The one or more motion sensors may include potentiometers that detect a state of the gimbals and motors and thus a position and/or orientation of the image sensor relative to a movable platform (e.g., a drone) connected by the gimbals and motors. Data from the one or more motion sensors may be combined to determine 520 the sequence of estimates of the orientation of the image sensor. For example, determining 520 the sequence of orientation estimates may include applying quadratic estimation to sensor data from the one or more motion sensors.

The process 500 includes, based on the sequence of orientation estimates, invoking 530 a mechanical stabilization system (e.g., the mechanical stabilization system 420) to reject motions of the image sensor occurring within a first operating bandwidth with an upper cutoff frequency. For example, the mechanical stabilization system may include gimbals and motors (e.g., the gimbals and motors 316) controlled by proportional integral derivative (PID) controllers. For example, the mechanical stabilization system may be invoked 530 by calling and/or executing a software implementation of a controller of the mechanical stabilization system and causing it to process input data, based on the sequence of orientation estimates, to generate control signals to drive actuators (e.g., the gimbals and motors 316) to control the orientation and/or position of the image sensor. For example, the mechanical stabilization system may be invoked 530 by inputting data, based on the sequence of orientation estimates, to a specialized hardware implementation of a controller of the mechanical stabilization system and causing it to process the input data to generate control signals to drive actuators (e.g., the gimbals and motors 316) to control the orientation and/or position of the image sensor. In some implementations, the data input to the mechanical stabilization system is filtered to enforce the first operating bandwidth on a linear controller. For example, a first filter (e.g., with a transfer function similar to the transfer function 710 illustrated in FIG. 7) with a pass band matching the first operating bandwidth may be applied to the sequence of orientation estimates to obtain data that is input to the mechanical stabilization system. Invoking 530 the mechanical stabilization system may reduce undesired motion of the image sensor and associated distortions (e.g., blurring and shaking between frames of video).

The process 500 includes receiving 540 an image from the image sensor. The image sensor may be part of an image capture system (e.g., the movable imaging system 10, the image capture device 310, or the image capture device 340). In some implementations, the image sensor may be attached to a processing apparatus that implements the process 500. For example, the image may be received 540 from the image sensor via a bus. In some implementations, the image may be received 540 via a communications link (e.g., the communications link 350). For example, the image may be received 540 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image may be received 540 via communications interface 366. For example, the image may be received 540 as an input image signal, which may represent each pixel value in a defined format, such as in a RAW image format. In some implementations, the image may be frame of video, i.e., one of a sequence of images of a video. In some implementations, the image is received 540 directly from the image sensor without intermediate image processing. In some implementations, the image is received 540 after being subjected to intermediate image processing (e.g., correction of dead pixels, band processing, decoupling of vertical blanking, spatial noise reduction, and/or temporal noise reduction).

The process 500 includes, based on the sequence of orientation estimates, invoking 550 an electronic image stabilization module (e.g., the electronic image stabilization module) to correct the image for rotations of the image sensor occurring within a second operating bandwidth with a lower cutoff frequency to obtain a stabilized image. The lower cutoff frequency may be greater than the upper cutoff frequency, so that the first operating bandwidth and the second operating bandwidth are substantially non-overlapping. For example, the electronic image stabilization module may be invoked 550 by calling and/or executing a software implementation of the electronic image stabilization module and causing it to process input data, based on the sequence of orientation estimates, to determine and apply a corrective rotation transformation to the image from the image sensor to stabilize the image (e.g., with respect to other images in sequence of frames of video). For example, the electronic image stabilization module may be invoked 550 by inputting data, based on the sequence of orientation estimates, to a specialized hardware implementation of the electronic image stabilization module and causing it to process the input data to determine and apply a corrective rotation transformation to the image from the image sensor to stabilize the image. In some implementations, the data input to the electronic image stabilization module is filtered to enforce the second operating bandwidth on a linear controller. For example, a second filter (e.g., with a transfer function similar to the transfer function 720 illustrated in FIG. 7) with a pass band matching the second operating bandwidth may be applied to the sequence of orientation estimates to obtain data that is input to the electronic image stabilization module. Having substantially non-overlapping operating bandwidths may prevent or reduce interference between the dynamics of the mechanical stabilization system and the dynamics of the electronic image stabilization module and improve image quality of the stabilized image. For example, certain higher frequency motions of the image sensor (e.g., vibrations) may be too fast to be efficiently rejected by the mechanical stabilization system and thus may cause distortion of the image. This remaining distortion may be corrected in whole or in part by digital image processing in the electronic image stabilization module.

The process 500 includes storing, displaying, or transmitting 560 an output image based on the stabilized image. In some implementations, the output image is the stabilized image. In some implementations, the stabilized image may by subject to additional image processing (e.g., perceptual tone mapping, lens distortion correction, electronic rolling shutter correction, stitching with parallax correction and blending to combine images from multiple image sensors, and/or output projection) to determine the output image. For example, the output image may be transmitted 560 to an external device (e.g., a personal computing device) for display or storage. For example, the output image may be stored 560 in memory of a processing apparatus (e.g., the processing apparatus 312 or the processing apparatus 362). For example, the output image may be displayed 560 in the user interface 320 or in the user interface 364. For example, the output image may be transmitted 560 via the communications interface 322.

Figure 6:
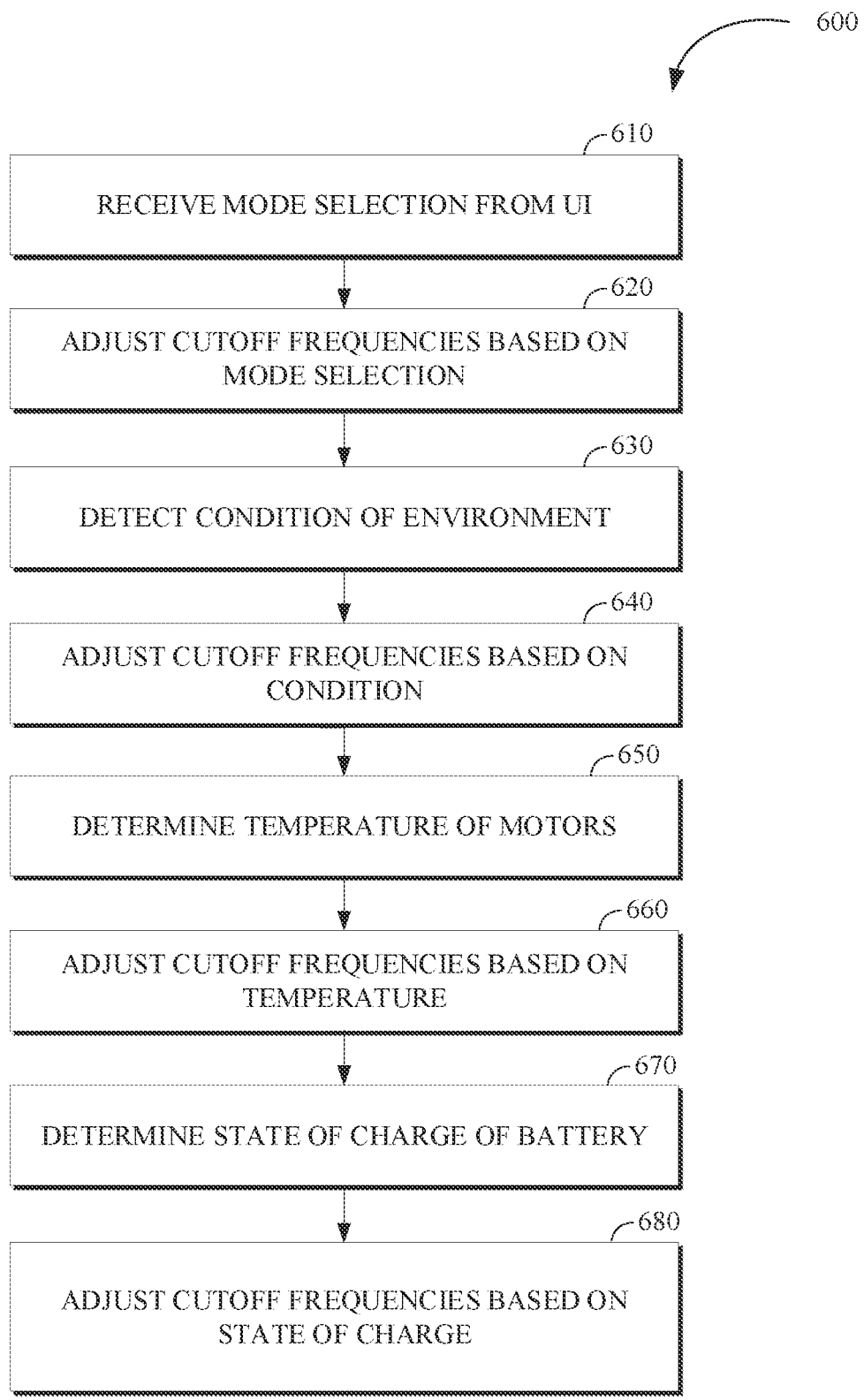
FIG. 6 is a flowchart of an example of a process for adjusting the operating bandwidths of a mechanical stabilization system and an electronic image stabilization module.

FIG. 6 is a flowchart of an example of a process 600 for adjusting the operating bandwidths of a mechanical stabilization system and an electronic image stabilization module. The process 600 includes receiving 610 a mode selection input from a user interface; adjusting 620 the upper cutoff frequency and the lower cutoff frequency based on the mode selection input; detecting 630 a condition of the environment; adjusting 640 the upper cutoff frequency and the lower cutoff frequency based on the condition; determining 650 a temperature of the motors of the mechanical stabilization system; adjusting 660 the upper cutoff frequency and the lower cutoff frequency based on the temperature; determining 670 a state of charge of a battery; and adjusting 680 the upper cutoff frequency and the lower cutoff frequency are based on the state of charge. For example, the process 600 may be implemented by the movable imaging system 10 of FIG. 1, the system 300 of FIG. 3A, the system 330 of FIG. 3B, or the system 400 of FIG. 4. For example, the process 600 may be implemented by an image capture device, such the image capture device 310 shown in FIG. 3A. For example, the process 600 may be implemented by a personal computing device, such as the personal computing device 360.

The process 600 includes receiving 610 a mode selection input from a user interface (e.g., the user interface 320 or the user interface 364). For example, the user mode selection may be based on a user pressing a mode button or icon. For example, the mode selection input may specify a high image quality mode or a low image quality mode. For example, the user mode selection may be based on a user sliding a wipe bar to manually adjust an image quality level within a range of discrete values. For example, the user mode selection may specify other camera modes, such as a frame rate or shutter speed.

The process 600 includes adjusting 620 the upper cutoff frequency and the lower cutoff frequency based on the mode selection input. For example, the upper cutoff frequency and the lower cutoff frequency may be increased based on a mode selection input specifying a high image quality mode. For example, the upper cutoff frequency and the lower cutoff frequency may be decreased based on a mode selection input specifying a low image quality mode. For example, the upper cutoff frequency and the lower cutoff frequency may be shifted by an amount that is proportional to a change in image quality level indicated by a mode selection input. For example, the upper cutoff frequency and the lower cutoff frequency may be increased based on a mode selection input specifying a low frame rate or a low shutter speed.

The process 600 includes detecting 630 a condition of an environment viewed by the image sensor. Dynamic environment may be taken into account such that low light, high motion, high noise, and high contrast moments can dynamically rely more on the mechanical stabilization system and less on the electronic image stabilization module. For example, the condition may be selected from the group consisting of low light, high motion, high noise, and high contrast.

The process 600 includes adjusting 640 the upper cutoff frequency and the lower cutoff frequency based on the condition. For example, the upper cutoff frequency and the lower cutoff frequency may be increased based on detected 630 condition indicating low light, high motion, high noise, or high contrast.

The process 600 includes determining 650 a temperature of motors of the mechanical stabilization system. Temperature of motors may be determined 650 by direct measurement or by indirect estimation with models. In a direct measurement technique a sensor such as a thermistor may be utilized to sample motor temp. In some implementations, a thermodynamic model of the motors is used to estimate the motor temperature based on ambient temp or a worst case fixed value such as the maximum guaranteed operational ambient temp in combination with a calculation. The calculation may be achieved by a motor controller sampling the current that is applied to the motor and roughly treating it as a thermal loss and calculating power into the motor as $I^2 \ast R$ where R is the resistance of the motor and I is the current. A model may be used for each motor/structure and a lookup table or curve fit for the algorithm to reference. For example, determining 650 the temperature may include receiving measurements of current drawn by the motors of the mechanical stabilization system, and estimating the temperature based on the measurements of current.

The process 600 includes adjusting 660 the upper cutoff frequency and the lower cutoff frequency based on the temperature. Reducing the upper cutoff frequency and the lower cutoff frequency and thus reducing the first operation bandwidth of the mechanical stabilization system may cause less power to be applied to the motors and thus cool the motors over time. The determined 650 temperature of the motors may be compared to a maximum rated temperature for the motors and the first bandwidth may be reduced if the temperature is too close or over the maximum rated temperature by an amount that may depend on the temperature. In some implementations, the upper cutoff frequency and the lower cutoff frequency are adjusted 660 based on a difference between the temperature and a maximum rated temperature for the motors of the mechanical stabilization system. For example, the upper cutoff frequency of the mechanical stabilization system may be adjusted 660 according to:

$$\text{MSS\_CF} = (((M\_T - t) + B) \ast S\_F) + \text{MSS\_MIN\_CF}$$

Where MSS_CF is the upper cutoff frequency of the mechanical stabilization system, M_T is the maximum rated temperature of the motors, t is the determined 650 temperature, B is a constant bias term, S_F is a constant scale factor, and MSS_MIN_CF is a minimum value of the upper cutoff frequency of the mechanical stabilization system. The lower cutoff frequency of the electronic image stabilization module may also be adjusted using a similar equation with a different offset value (e.g., EIS_MIN_CF instead of MSS_MIN_CF).

The process 600 includes determining 670 a state of charge of a battery. An integrated battery tester may be used to measure and/or estimate a state of charge of the battery (e.g., based on a sequence of periodically sampled voltage measurements of the battery).

The process 600 includes adjusting 680 the upper cutoff frequency and the lower cutoff frequency based on the state of charge. Reducing the upper cutoff frequency and the lower cutoff frequency and thus reducing the first operation bandwidth of the mechanical stabilization system may cause less power to be applied to the motors and thus conserves battery charge. The determined 670 state of charge may be compared to a minimum charge level (e.g., 10% charged) and the first bandwidth may be reduced if the state of charge is too close or under the minimum charge level by an amount that may depend on the state of charge. In some implementations, the upper cutoff frequency and the lower cutoff frequency are adjusted 680 based on a difference between the state of charge and a minimum charge level for the battery. For example, the upper cutoff frequency of the mechanical stabilization system may be adjusted 680 according to:

$$\text{MSS\_CF} = (((s - \text{MIN\_CL}) + B) \ast S\_F) + \text{MSS\_MIN\_CF}$$

Where MSS_CF is the upper cutoff frequency of the mechanical stabilization system, M_T is the maximum rated temperature of the motors, s is the determined 670 state of charge, B is a constant bias term, S_F is a constant scale factor, and MSS_MIN_CF is a minimum value of the upper cutoff frequency of the mechanical stabilization system. The lower cutoff frequency of the electronic image stabilization module may also be adjusted using a similar equation with a different offset value (e.g., EIS_MIN_CF instead of MSS_MIN_CF).

Figure 7:
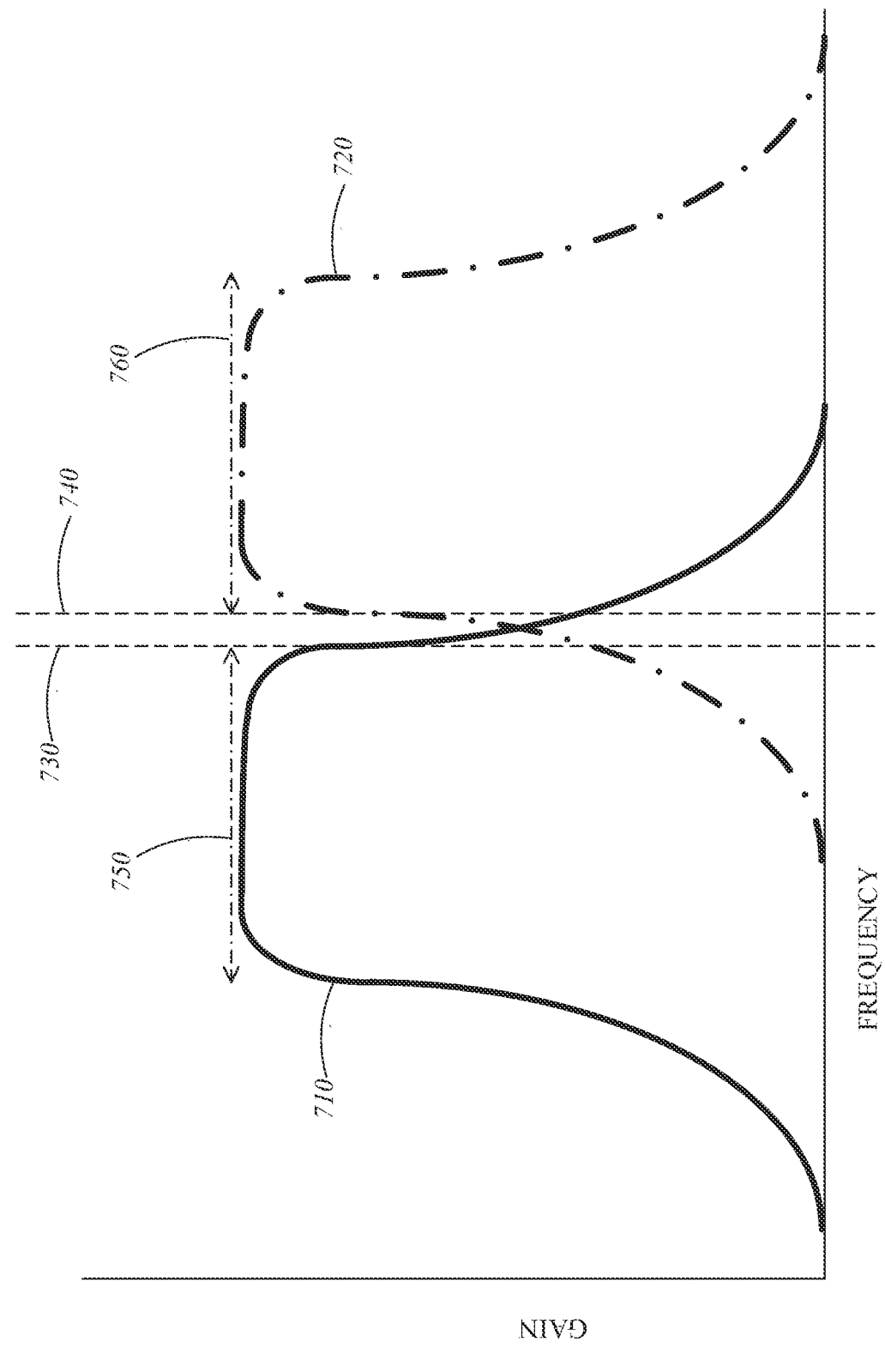
FIG. 7 is a plot of an example of a transfer function of an MSS filter, corresponding to the operating bandwidth of the MSS, overlaid with a transfer function of an EIS filter, corresponding to the operating bandwidth of the EIS.

FIG. 7 is a plot 700 of an example of a transfer function 710 of an MSS filter, corresponding to the operating bandwidth of the MSS, overlaid with a transfer function 720 of an EIS filter, corresponding to the operating bandwidth of the EIS. The plot 700 shows filter gain on y axis and frequency on the x axis. The transfer function 710 of the MSS filter has an upper cutoff frequency 730. The transfer function 720 of the EIS filter has a lower cutoff frequency 740. A first bandwidth 750 is the operating bandwidth of the corresponding mechanical stabilization system. A second bandwidth 760 is the operating bandwidth of the corresponding electronic image stabilization module. The lower cutoff frequency 740 is greater than the upper cutoff frequency 730, so that the first bandwidth 750 and the second bandwidth 760 are substantially non-overlapping.

It should be noted that the processes described in relation to FIGS. 5-6 and similar processes may be applied to multiple images from different image sensors of an image capture apparatus (e.g., the movable imaging assembly 20 shown in FIG. 1, the system 300 of FIG. 3A, or the system 330 of FIG. 3B). The resulting stabilized images may be combined using a stitching operation.

In some implementations, a mechanical stabilization system may be integrated in an image capture module (e.g., the image capture module 800 describe below) that includes an image sensor. A movable platform for image capture may be a handheld module, such as the handheld module 900 described below, that attaches to an image capture module to form a movable imaging assembly 1000 as described in relation to FIGS. 10A-B. For example, process 500 of FIG. 5 may be implemented by the movable imaging assembly 1000. For example, process 600 of FIG. 6 may be implemented by the movable imaging assembly 1000.

Figure 8A:
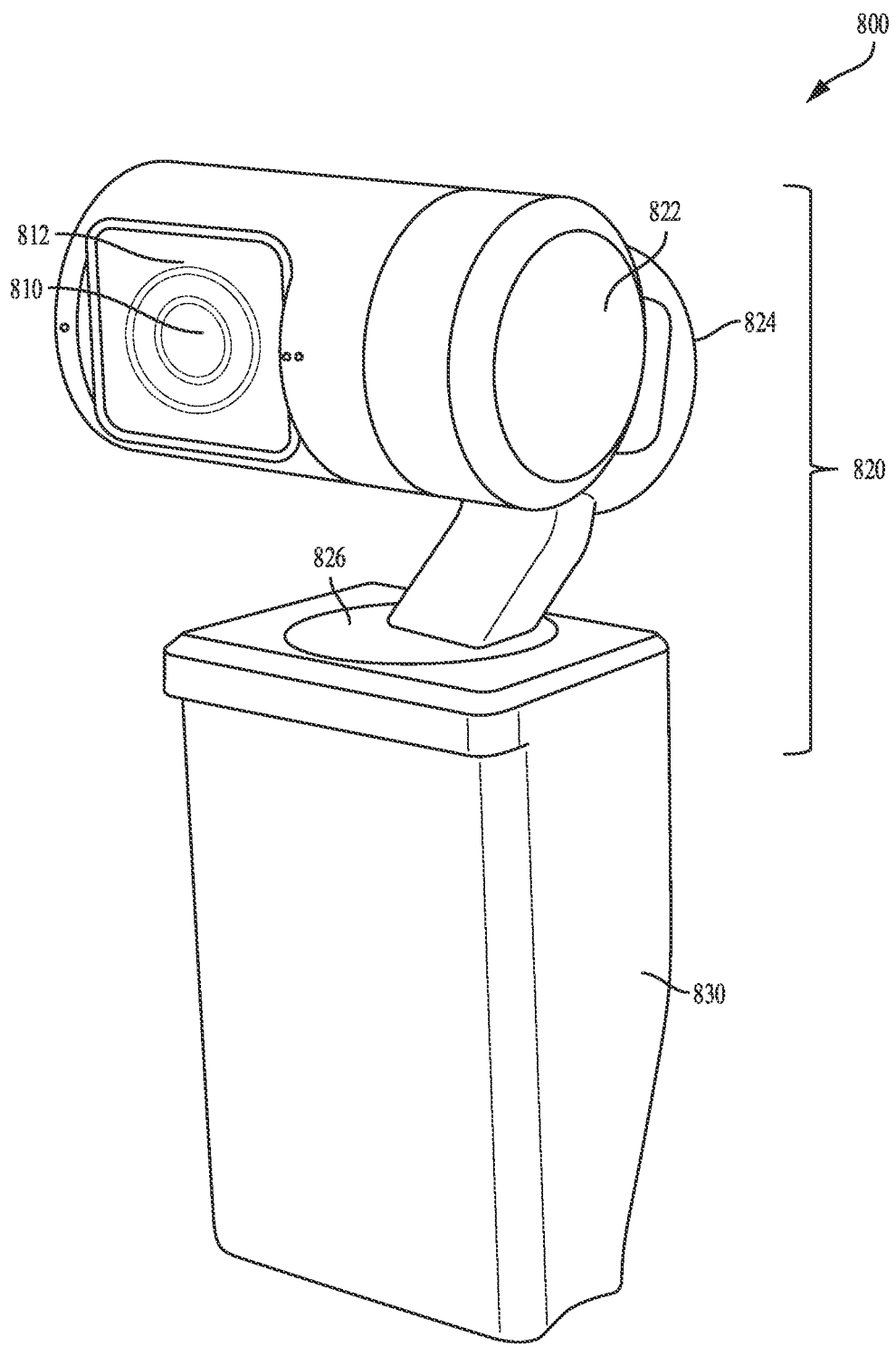
FIG. 8A is a pictorial illustration of an example of an image capture module from a first perspective.
Figure 8B:
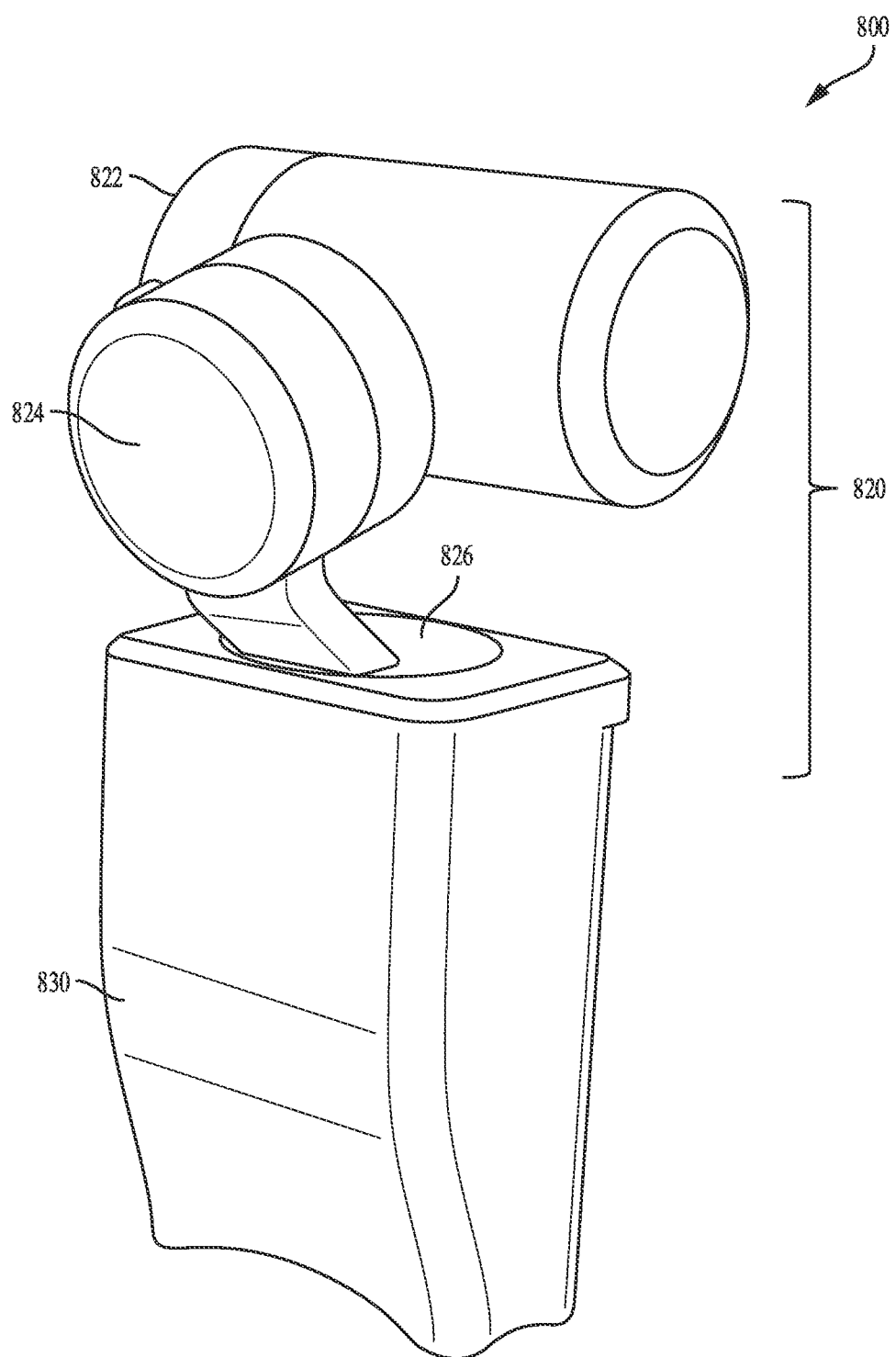
FIG. 8B is a pictorial illustration of an example of an image capture module from a second perspective.

FIGS. 8A and 8B are pictorial illustrations of an example of an image capture module 800 from two perspectives. The image capture module 800 includes an image sensor 810 configured to capture images; a mechanical stabilization system 820, including gimbals and motors (822, 824, and 826); and a connector 830 configured to interchangeably connect the mechanical stabilization system to an aerial vehicle (e.g., a quadcopter drone) and a handheld module (e.g., the handheld module 900).

The image capture module 800 includes an image sensor 810 configured to capture images (e.g., still images or frames of video). The image sensor 810 may be configured to detect light of a certain spectrum (e.g., the visible spectrum or the infrared spectrum) and convey information constituting an image as electrical signals (e.g., analog or digital signals). For example, the image sensor 810 may include charge-coupled devices (CCD) or active pixel sensors in complementary metal-oxide-semiconductor (CMOS). The image capture module 800 includes a lens 812 (e.g., a wide-angle rectilinear lens). The image sensor 810 detects light from the environment that is incident through the lens 812.

The image capture module 800 may also include a processing apparatus (e.g., including memory, an image signal processor, a hardware encoder, a microcontroller, and/or other processor) that is configured to track a user based on position data from a beacon module and/or based on computer vision tracking of the user in images from the image sensor 810 in a first usage scenario, where the image capture module 800 is attached to an aerial vehicle (e.g., a quadcopter drone), and/or in a second usage scenario, where the image capture module 800 is attached to an handheld module (e.g., the handheld module 900). In some implementations, the processing apparatus may be configured to perform image processing operations (e.g., correction of dead pixels, band processing, decoupling of vertical blanking, spatial noise reduction, temporal noise reduction, automatic white balance, global tone mapping, local tone mapping, lens distortion correction, electronic rolling shutter correction, electronic image stabilization, output projection, and/or encoding) on images captured by the image sensor 810. In some implementations, some or all of the image processing operations are performed on the images captured by the image sensor by a processing apparatus that is located in whole or in part in another component of a larger movable imaging system 10. For example, the processing apparatus may be located inside the connector 830 below the gimbal 826 of the mechanical stabilization system 820.

The image capture module 800 includes a mechanical stabilization system 820, including gimbals and motors (822, 824, and 826) (e.g., corresponding to pitch, yaw, and roll respectively), that is integrated with the image sensor 810 in the image capture module 800 and configured to control an orientation of the image sensor 810. For example, the gimbals and motors (822, 824, and 826) may enable rotation of the image sensor with three degrees of freedom. In some implementations, the gimbals and motors (822, 824, and 826) respectively enable a wide range of rotation angles (e.g., up to 180 degrees, 270 degrees or 360 degrees). A gimbal 826 of the mechanical stabilization system 820 is substantially flush with a surface of the connector 830 causing the mechanical stabilization system 820 to have a low profile and protect the gimbal 826 from damage. In some implementations, the gimbal 826 is contained entirely within a body of the connector 830, at or below the grade of an outer surface of the connector 830. For example, the mechanical stabilization system 820 may be controlled with a controller (e.g., a proportional integral derivative controller) based on target orientations determined by a processing apparatus based on image data from the image sensor 810, motion sensor data from a motion sensor in the image capture module 800 or a movable platform (e.g., a quadcopter drone or the handheld module 900) to which the image capture module 800 module is attached, and/or position data for a tracking target from a beacon.

The mechanical stabilization system 820 may be configured to enable an electronically actuated transport mode. When many 3-axis gimbals are powered off they simply float around aimlessly and are cumbersome to put away or transport. In some implementations, the mechanical stabilization system 820 is configured to enable an electronically actuated transport mode in which: upon the occurrence of triggering event (e.g., a specialized user command or a command to power OFF the image capture module 800 or the mechanical stabilization system 820, each of the gimbals and motors (822, 824, and 826) are electronically controlled to assume a fold-flat position and maintain that position for a fixed time period (e.g., 10, 30, or 60 seconds), allowing the user to easily slip the image capture module 800 into a pocket, carrying case, backpack, or other container. After the time has expired, the mechanical stabilization system 820 will completely power OFF allowing the gimbal arms to move freely, once in the desired transport location. In some implementations, this electronically actuated transport mode can be accompanied by a physical lock which is either integrated into the gimbal itself, or via an external means such as a bracket or carrying case. For example, the electronically actuated transport mode may be implemented using electronic motor position sensors, mechanical fold-flat ability (range-of-motion), and firmware control (e.g., implemented in a processing apparatus of the image capture module 800).

The image capture module 800 includes a connector 830 configured to interchangeably connect the mechanical stabilization system 820 to an aerial vehicle (e.g., a quadcopter drone) in a first usage scenario and a handheld module in a second usage scenario (e.g., the handheld module 900). The connector may be keyed to a slot of the aerial vehicle and keyed to a slot of the handheld module. The connector 830 is keyed by virtue of the shape of an outer surface of the connector 830, which is fitted to the corresponding shape of the slot in the aerial vehicle and the corresponding shape in the slot of the handheld module (e.g., the handheld module 900). The keyed shape of the connector 830 includes some asymmetry (i.e., the rectangular cross-section of the connector 830 that narrows, sloping inward, about half way down the connector 830 on one side), which may facilitate easy connection of the aerial vehicle and the handheld module to the image capture module 800 by preventing a user from accidentally inserting the connector 830 in an improper orientation. For example, the connector 830 may include a first fastening mechanism and a second fastening mechanism configured to secure the connector 830 when the image capture module 800 is attached to the handheld module. The fastening mechanisms may be configured such that either of the first fastening mechanism and second fastening mechanism is sufficient to secure the connector 830. The connector 830 includes an electrical connector (e.g., a universal serial bus (USB) type C connector) nested inside of the keyed outer portion of the connector 830. The electrical connector may include multiple conductors that can be used to provide power from a movable platform (e.g., the handheld module 900) to the image capture module 800 and transfer communication signals (e.g., USB 2.0, USB 3.0, I2C, SPI, and/or MIPI signals) between the movable platform and the image capture module 800 when they are connected. In some implementations, the connector 830 includes pairs of conductors respectively used to transfer power to the image capture module 800, bulk transfer data from the image capture module 800, transfer control signals to the image capture module 800, and transfer real-time video data from the image capture module 800.

The connector may include an electrical connector (e.g., a universal serial bus (USB) type C connector) nested inside of the keyed outer portion of the connector. The electrical connector may include multiple conductors that can be used to provide power from the handheld module 900 to the image capture module 800 and transfer communication signals (e.g., USB 2.0, USB 3.0, I2C, SPI, and/or MIPI (Mobile Industry Processor Interface) signals) between the handheld module 900 and the image capture module 800 when they are connected. For example, conductors of the connection may be used to transfer power, high-speed bulk data transfers, real-time embedded control signaling, and/or raw video signals at a capture frame rate. For example, the connector may include pairs of conductors respectively used to transfer power to the image capture module 800, bulk transfer data from the image capture module 800, transfer control signals to the image capture module 800, and transfer real-time video data from the image capture module 800.

In the example of FIGS. 8A and 8B, the gimbal 826 of the mechanical stabilization system 820 is substantially flush with a surface of the connector 830. The gimbal 826 may be protected by a body of the connector 830 to protect the gimbal from damage and/or the ingress of dust. For example, gimbal 826 may be a roll gimbal and with a corresponding roll motor with a roll motor housing that is built into the housing of the connector 830 so that the roll motor housing sits below the grade of an outer surface of the connector 830 and is hidden and/or protected. This configuration may provide advantages over other mechanical stabilization systems with all of their gimbals exposed (e.g., three axis gimbals exposed, including a roll axis motor housing sitting on top of a main housing). For example, locating the gimbal 826 within the connector 830 and/or substantial flush with a surface of the connector 830 may reduce amount of exposed gimbal parts, reduce height of gimbal above a main housing, and/or simplify the overall design by reducing the number visible motor elements (e.g., from three gimbals two gimbals).

Figure 9A:
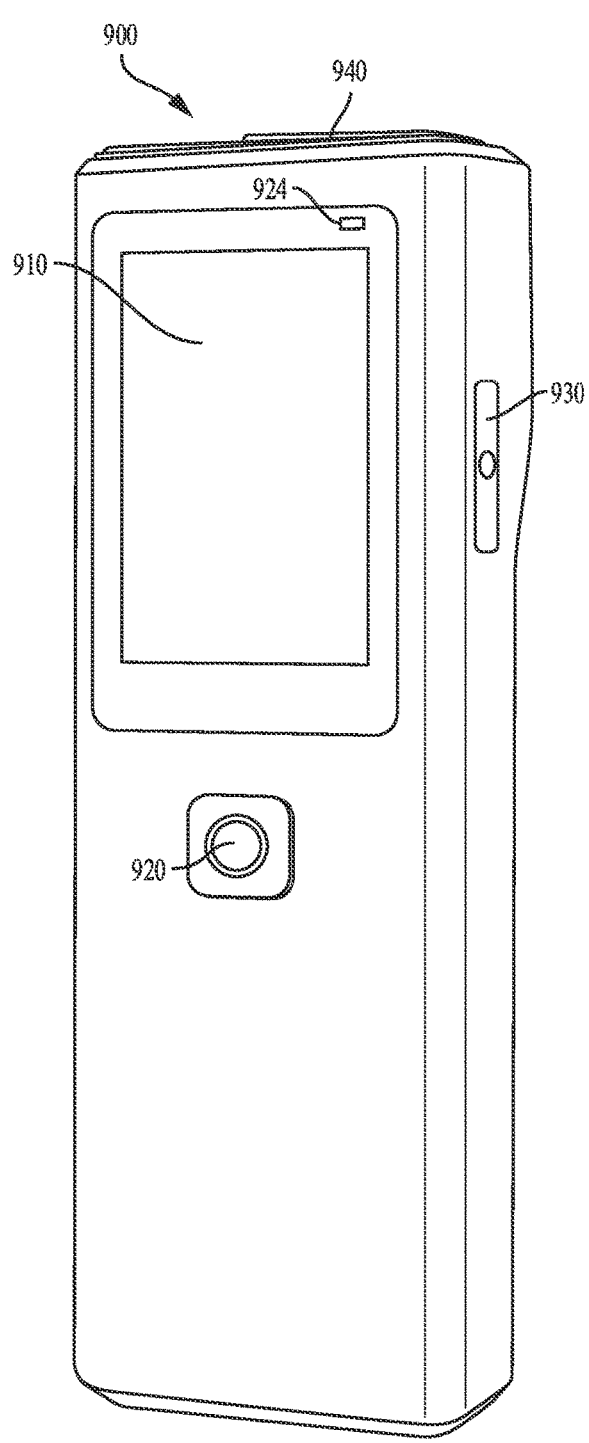
FIG. 9A is a pictorial illustration of an example of a handheld module from a first perspective.
Figure 9B:
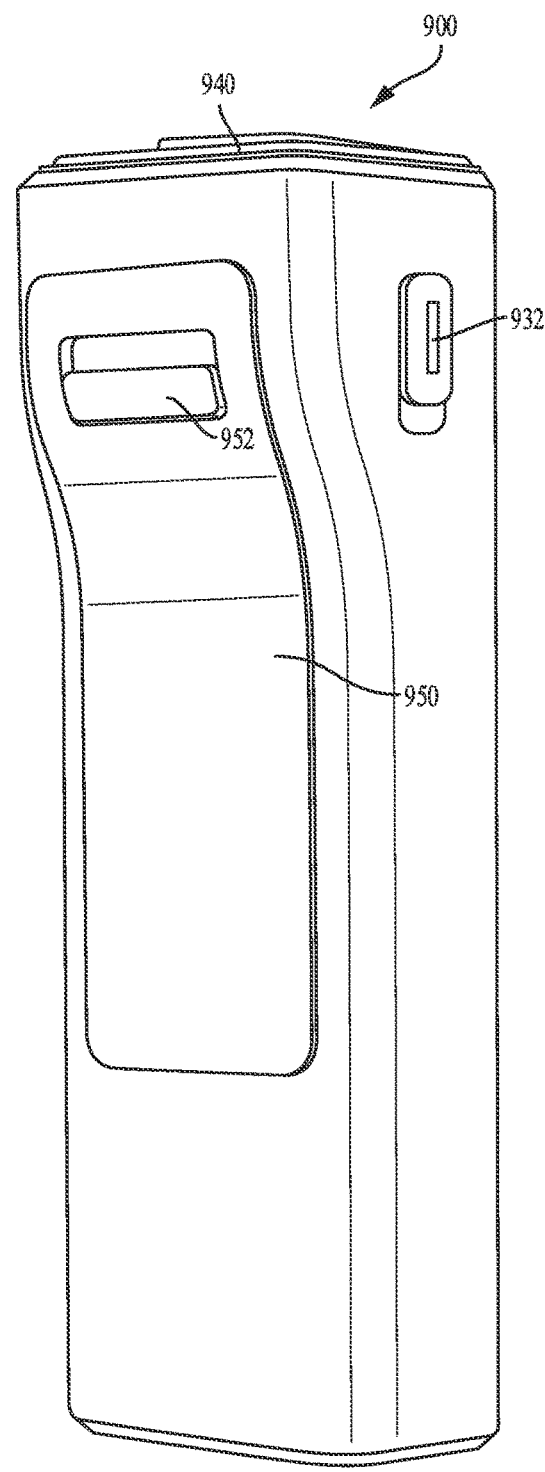
FIG. 9B is a pictorial illustration of an example of a handheld module from a second perspective.

FIGS. 9A and 9B are pictorial illustrations of an example of a handheld module 900 from two perspectives. The handheld module 900 includes a display 910, a record button 920, a status indicator light 924, a first fastening mechanism 930 and a second fastening mechanism 932, a slot 940 with a shape matched to the connector 830 of the image capture module 800, and a battery cover 950 with a battery release latch 952.

The handheld module 900 may be shaped such that it may be ergonomically held in a hand during use while operating a touch display and/or a button (e.g., the record button 920) of the handheld module 900. The outer material may be selected to have a rubbery grip texture.

The handheld module 900 includes a user interface that allows a user to control image capture with an attached image capture module (e.g., the image capture module 800). The user interface includes the display 910 for viewing captured images, the record button 920 for snapping still images or starting or stopping recording of video, and the status indicator light 924. The status indicator light 924 may include a multi-color LED device and may reflect the status of an electronic connection to an attached image capture module and/or a recording state. In some implementations, the display 910 is a touch-screen that enables the input of additional commands by a user. For example, a user may input commands to change a gimbal angle; enter "selfie-mode," or "HiLight Tag" by voice command and/or input received via the touch interface of the display 910 and/or a button of the handheld module 900. A "selfie-mode" function may rotate the gimbal 826 (e.g., rotate 180 degrees), such that an image sensor (e.g., the image sensor 810) faces the same direction as the display 910. A "HiLight Tag" function may enable a user to mark an image or frames of video as significant with metadata. For example, a "High-Light Tag" gesture may be defined for a touch screen interface of the display 910, which may enable a user to generate portions of a video data temporally and/or spatially by specifying an object or other portions of a frame as frames are displayed on the display 910.

The first fastening mechanism 930 and the second fastening mechanism 932 are configured to secure the connector 830 of the image capture module 800 when it is inserted in the slot 940 to attach the handheld module 900 to the image capture module 800. The first fastening mechanism 930 and the second fastening mechanism 932 include a button and a slider, respectively, that may be used to disengage the first fastening mechanism 930 and the second fastening mechanism 932 in order to disconnect from and attached image capture module (e.g., the image capture module 800). Other types of fastening mechanisms are also possible.

The battery cover 950 may be opened using the battery release latch 952 to access a battery of the handheld module 900 for replacement or recharging. For example, multiple batteries may be used and swapped into the handheld module 900 to enable continued use while one of the batteries is charged in an external charger.

Figure 10A:
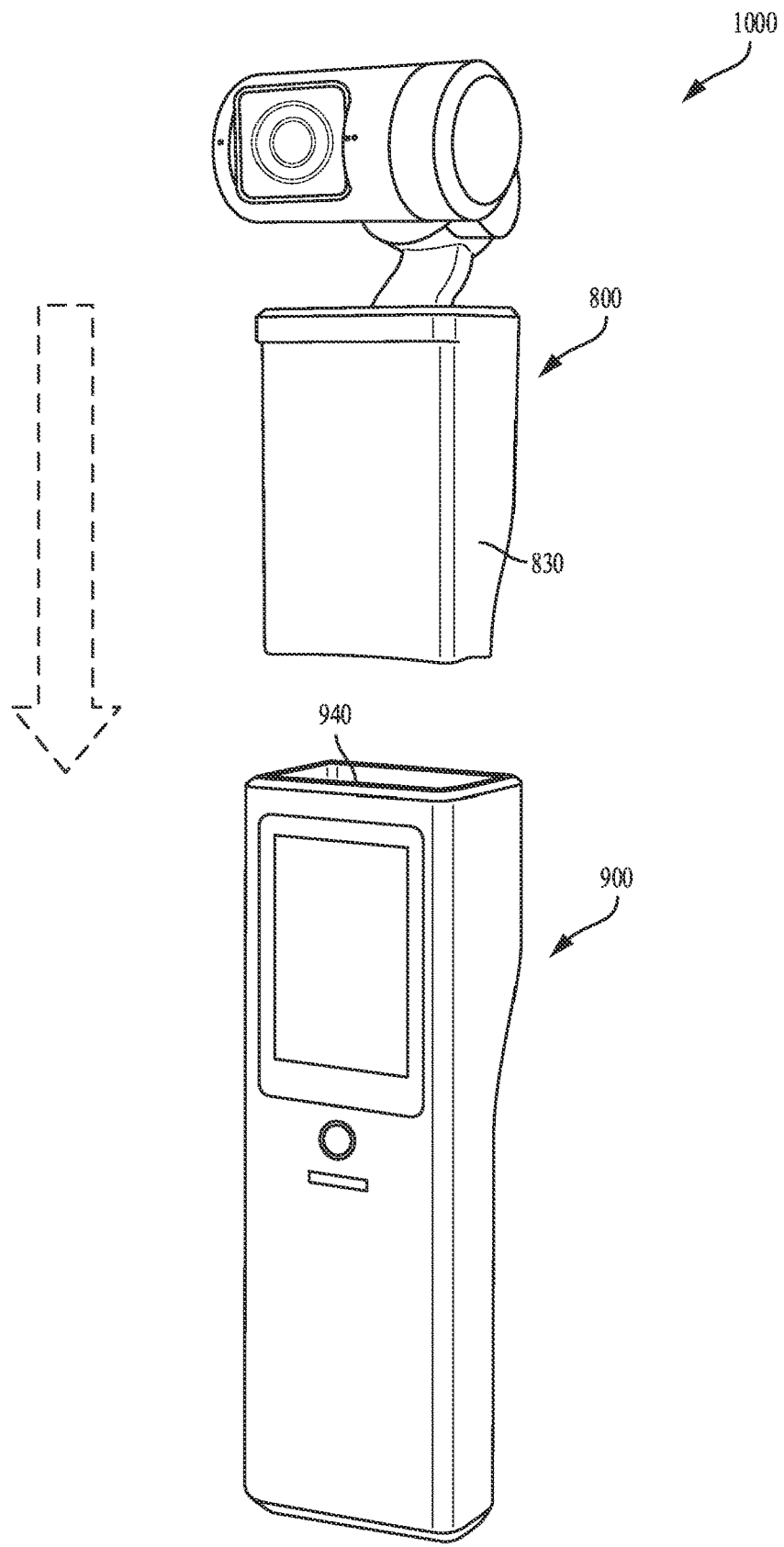
FIG. 10A is a pictorial illustration of an example of a handheld module oriented to be connected to an image capture module.

FIG. 10A is a pictorial illustration of an example of a handheld module 900 oriented to be connected to an image capture module 800 to form a movable imaging assembly 1000. The connector 830 of the image capture module 800 is keyed to the slot 940 of the handheld module 900. From the illustrated orientation, the image capture module 800 may be moved down to slide the connector 830 into the slot 940 to attach the image capture module 800 to the handheld module 900 to form the movable imaging assembly 1000. When the connector 830 is inserted into the slot 940, paired fastening mechanisms (e.g., latches) in the connector 830 and the slot 940 may engage to secure the newly formed connection. For example, spring loaded latches may engage to secure the connection of the movable imaging assembly 1000. As part of the connection, mated electronic connectors (e.g., USB Type C connectors) nested in the connector 830 and the slot 940 may engage to form an electronic connection including multiple conductors, which may be used to supply power from the handheld module 900 to image capture module 800 and to transfer control signals and data (e.g., image data) between the attached modules of the movable imaging assembly 1000.

When a user seeks to disconnect the handheld module 900 from the image capture module 800, they may release these fastening mechanisms. For example, latches may be manually released by a user using their fingers on buttons or release levers. In some implementations, two latches must be simultaneously released in order to disconnect the handheld module 900 from the image capture module 800, which may reduce the risk of accidental disconnection. For example, a cycle of connecting and disconnecting the handheld module 900 from the image capture module 800 may only take a few seconds for a user to complete.

Figure 10B:
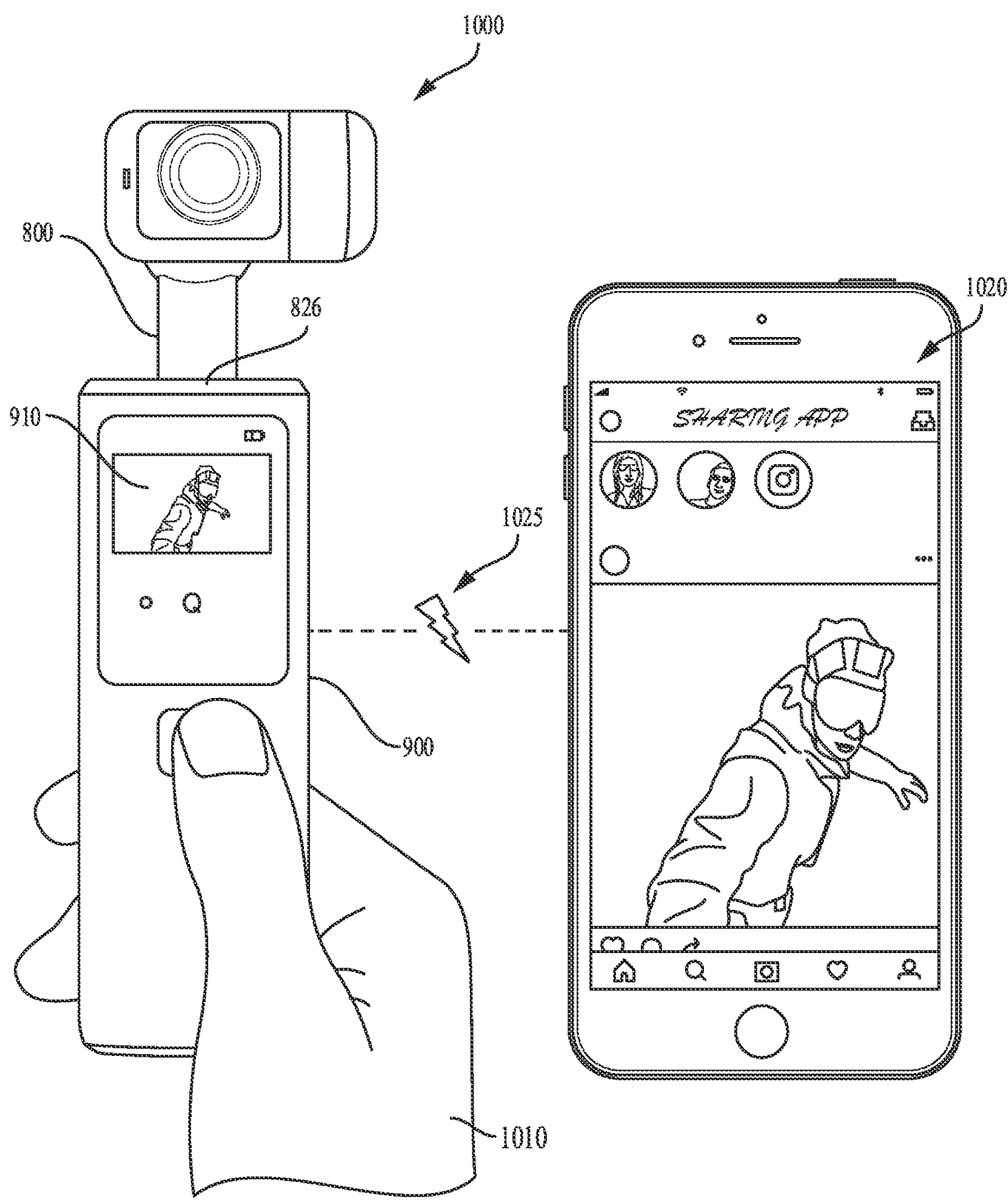
FIG. 10B is a pictorial illustration of an example of a movable imaging assembly in communication with a personal computing device.

FIG. 10B is a pictorial illustration of an example of a movable imaging assembly 1000 in communication with a personal computing device 1020. In the usage scenario of FIG. 10B, the movable imaging assembly 1000 is held in a hand 1010 of a user and is capturing images (e.g., still images or frames of video) of the user. The captured images are displayed on the display 910 of the handheld module 900. The captured images may be transferred to the personal computing device 1020 (e.g., a smartphone) via a wireless link 1025 (e.g., using a Bluetooth link or a WiFi link). The personal computing device 1020 may then be used to display and/or share or otherwise transmit and distribute the captured images. The personal computing device 1020 may also be configured with an application that may be used to remotely control image capture functions of the movable imaging assembly 1000 and/or update software installed on a processing apparatus of the movable imaging assembly 1000.

In this example, a gimbal 826 of the mechanical stabilization system is substantially flush with a surface (e.g., the top surface) of the handheld module 900 when the image capture module 800 is attached to the handheld module 900. This may result in the mechanical stabilization system and the image sensor having a low profile and protecting the gimbal 826 to reduce risk of damage to the gimbal 826. This configuration may provide advantages over other mechanical stabilization systems with all of their gimbals exposed (e.g., three axis gimbals exposed, including a roll axis motor housing sitting on top of a main housing). For example, locating the gimbal 826 within the handheld module 900 and/or substantial flush with a surface of the handheld module 900 when the image capture module 800 is attached to the handheld module 900 may reduce amount of exposed gimbal parts, reduce height of gimbal above a main housing, and/or simplify the overall design by reducing the number of visible motor elements (e.g., from three gimbals two gimbals).

A first implementation is an system that includes: an image sensor configured to capture an image; one or more motion sensors configured to detect motion of the image sensor; a mechanical stabilization system, including gimbals and motors, configured to control an orientation of the image sensor; an electronic image stabilization module configured to correct images for rotations of the image sensor; and a processing apparatus that is configured to: determine a sequence of orientation estimates based on sensor data from the one or more motion sensors; based on the sequence of orientation estimates, invoke the mechanical stabilization system to reject motions occurring within a first operating bandwidth with an upper cutoff frequency; receive the image from the image sensor; based on the sequence of orientation estimates, invoke the electronic image stabilization module to correct the image for rotations of the image sensor occurring within a second operating bandwidth with a lower cutoff frequency to obtain a stabilized image, wherein the lower cutoff frequency is greater than the upper cutoff frequency; and store, display, or transmit an output image based on the stabilized image. The first implementation may include a handheld module that is coupled to a housing of the image sensor by the gimbals of the mechanical stabilization system, wherein the handheld module includes a battery and an integrated display configured to display images received from the image sensor.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A device comprising:
   a mechanical stabilization system that has a first operating bandwidth, the mechanical stabilization system comprising a motor configured to control an orientation of an image sensor; and
   a processing apparatus configured to:
   determine a temperature of the motor; and
   adjust a cutoff frequency of the first operating bandwidth based on the temperature of the motor.

2. The device of claim 1, wherein the mechanical stabilization system is configured to reject motions of the image sensor that occur within the first operating bandwidth.

3. The device of claim 2, wherein the first operating bandwidth has an upper cutoff frequency.

4. The device of claim 1, further comprising:
   an electronic stabilization system that has a second operating bandwidth.

5. The device of claim 4, wherein the electronic stabilization system is configured to correct images for rotations of the image sensor.

6. The device of claim 5, wherein the processing apparatus is further configured to:
   adjust a cutoff frequency of the second operating bandwidth based on the temperature of the motor.

7. The device of claim 1, wherein the mechanical stabilization system includes a proportional integral derivative controller.

8. The device of claim 7, wherein the proportional integral derivative controller is tuned to enforce the first operating bandwidth.

9. A method comprising:
receiving an image from an image sensor;
filtering sensor data from one or more motion sensors with a pass band matching an operation bandwidth to the sequence of orientation estimates to obtain filtered data;
invoking an electronic image stabilization system to correct the image based on the filtered data to obtain a stabilized image; and
storing an output image based on the stabilized image.

10. The method of claim 9, further comprising:
invoking a mechanical image stabilization system to reject motions of the image sensor that occur within a first operating bandwidth.

11. The method of claim 10, wherein the first operating bandwidth has an upper cutoff frequency.

12. The method of claim 11, wherein the electronic image stabilization system has a second operating bandwidth.

13. The method of claim 12, wherein the electronic image stabilization system is configured to correct images for rotations of the image sensor.

14. The method of claim 13, further comprising:
adjusting a cutoff frequency of the first operating bandwidth.

15. The method of claim 14, further comprising:
adjusting a cutoff frequency of the second operating bandwidth.

16. A device comprising:
a mechanical stabilization system that has a first operating bandwidth, the mechanical stabilization system comprising a motor configured to control an orientation of an image sensor;
a battery configured to supply power to the motor; and
a processing apparatus configured to:
determine a state of charge of the battery; and
adjust a cutoff frequency of the first operating bandwidth based on the state of charge of the battery.

17. The device of claim 16, further comprising:
an electronic stabilization system that has a second operating bandwidth.

18. The device of claim 17, wherein the electronic stabilization system is configured to correct images for rotations of the image sensor.

19. The device of claim 18, wherein the first operating bandwidth has an upper cutoff frequency.

20. The device of claim 19, wherein the second operating bandwidth has a cutoff frequency that is greater than the upper cutoff frequency.

* * * * *